US011881225B2

(12) United States Patent
Disch et al.

(10) Patent No.: US 11,881,225 B2
(45) Date of Patent: *Jan. 23, 2024

(54) AUDIO ENCODER FOR ENCODING A MULTICHANNEL SIGNAL AND AUDIO DECODER FOR DECODING AN ENCODED AUDIO SIGNAL

(71) Applicant: Fraunhofer-Gesellschaft zur Foerderung der angewandten Forschung e.V., Munich (DE)

(72) Inventors: Sascha Disch, Fuerth (DE); Guillaume Fuchs, Bubenreuth (DE); Emmanuel Ravelli, Erlangen (DE); Christian Neukam, Kalchreuth (DE); Konstantin Schmidt, Nuremberg (DE); Conrad Benndorf, Nuremberg (DE); Andreas Niedermeier, Munich (DE); Benjamin Schubert, Nuremberg (DE); Ralf Geiger, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,260

(22) Filed: Jan. 13, 2022

(65) Prior Publication Data

US 2022/0139406 A1 May 5, 2022

Related U.S. Application Data

(63) Continuation of application No. 16/506,767, filed on Jul. 9, 2019, now Pat. No. 11,238,874, which is a (Continued)

(30) Foreign Application Priority Data

Mar. 9, 2015 (EP) .................................... 15158233
Jun. 17, 2015 (EP) .................................... 15172599

(51) Int. Cl.
*G10L 19/008* (2013.01)
*G10L 19/02* (2013.01)
(Continued)

(52) U.S. Cl.
CPC ............ *G10L 19/008* (2013.01); *G10L 19/02* (2013.01); *G10L 19/032* (2013.01); *G10L 19/04* (2013.01);
(Continued)

(58) Field of Classification Search
CPC ..... G10L 19/008; G10L 21/038; G10L 19/18; G10L 19/13; G10L 19/04; G10L 19/032; G10L 19/02
See application file for complete search history.

(56) References Cited

U.S. PATENT DOCUMENTS 5,956,674 A 9/1999 Smyth et al.
7,283,957 B2 10/2007 Minde et al.
(Continued)

FOREIGN PATENT DOCUMENTS

AU 2009267467 B2 3/2012
CN 1437747 A 8/2003
(Continued)

OTHER PUBLICATIONS

Thompson, Jeffrey, Aaron Warner, and Brandon Smith. "An active multichannel downmix enhancement for minimizing spatial and spectral distortions." Audio Engineering Society Convention 127. Audio Engineering Society, 2009. (Year: 2009).*
(Continued)

*Primary Examiner* — Brian L Albertalli
(74) *Attorney, Agent, or Firm* — Perkins Coie LLP; Michael A. Glenn

(57) ABSTRACT

Audio encoder for encoding a multichannel signal is shown. The audio encoder includes a downmixer for downmixing
(Continued)

the multichannel signal to obtain a downmix signal, a linear prediction domain core encoder for encoding the downmix signal, wherein the downmix signal has a low band and a high band, wherein the linear prediction domain core encoder is configured to apply a bandwidth extension processing for parametrically encoding the high band, a filterbank for generating a spectral representation of the multichannel signal, and a joint multichannel encoder configured to process the spectral representation including the low band and the high band of the multichannel signal to generate multichannel information.

22 Claims, 21 Drawing Sheets

Related U.S. Application Data continuation of application No. 15/695,668, filed on Sep. 5, 2017, now Pat. No. 10,388,287, which is a continuation of application No. PCT/EP2016/054775, filed on Mar. 7, 2016.

(51) Int. Cl.

*G10L 19/04* (2013.01)
*G10L 19/18* (2013.01)
*G10L 21/038* (2013.01)
*G10L 19/032* (2013.01)
*G10L 19/13* (2013.01)
*G10L 19/08* (2013.01)

(52) U.S. Cl.

CPC .............. *G10L 19/08* (2013.01); *G10L 19/13* (2013.01); *G10L 21/038* (2013.01)

(56) References Cited

U.S. PATENT DOCUMENTS

| | | | |
|---|---|---|---|
| 8,275,626 | B2 | 9/2012 | Neuendorf et al. |
| 8,428,958 | B2 | 4/2013 | Sung et al. |
| 8,831,958 | B2 | 9/2014 | Lee et al. |
| 9,129,593 | B2 | 9/2015 | Ojala |
| 9,275,648 | B2 | 3/2016 | Lee et al. |
| 9,489,957 | B2 | 11/2016 | Kjoerling et al. |
| 10,388,287 | B2 | 8/2019 | Disch et al. |
| 10,395,661 | B2 | 8/2019 | Disch et al. |
| 10,777,208 | B2 | 9/2020 | Disch et al. |
| 2004/0109471 | A1 | 6/2004 | Minde et al. |
| 2006/0009225 | A1 | 1/2006 | Herre et al. |
| 2008/0077412 | A1 | 3/2008 | Oh et al. |
| 2009/0210234 | A1 | 8/2009 | Sung et al. |
| 2009/0262945 | A1 | 10/2009 | Teo et al. |
| 2010/0114583 | A1 | 5/2010 | Lee et al. |
| 2010/0198589 | A1 | 8/2010 | Ishikawa et al. |
| 2010/0286990 | A1 | 11/2010 | Biswas et al. |
| 2011/0173008 | A1 | 7/2011 | Lecomte et al. |
| 2011/0173010 | A1 | 7/2011 | Lecomte et al. |
| 2011/0173011 | A1 | 7/2011 | Geiger et al. |
| 2011/0200198 | A1 | 8/2011 | Grill et al. |
| 2011/0202353 | A1 | 8/2011 | Neuendorf et al. |
| 2011/0202354 | A1 | 8/2011 | Grill et al. |
| 2011/0224994 | A1 | 9/2011 | Norvell et al. |
| 2011/0238426 | A1 | 9/2011 | Fuchs et al. |
| 2012/0002818 | A1 | 1/2012 | Heiko et al. |
| 2012/0226496 | A1 | 9/2012 | Yoon et al. |
| 2012/0245947 | A1 | 9/2012 | Neuendorf et al. |
| 2012/0253797 | A1 | 10/2012 | Geiger et al. |
| 2012/0265541 | A1 | 10/2012 | Geiger et al. |
| 2012/0271644 | A1 | 10/2012 | Bessette et al. |
| 2012/0290305 | A1 | 11/2012 | Feng et al. |
| 2012/0294448 | A1 | 11/2012 | Kim et al. |
| 2013/0030819 | A1 | 1/2013 | Purnhagen et al. |
| 2014/0016787 | A1 | 1/2014 | Neuendorf et al. |
| 2015/0380008 | A1 | 12/2015 | Atti et al. |
| 2016/0217800 | A1* | 7/2016 | Purnhagen ............ G10L 19/035 |
| 2016/0247508 | A1 | 8/2016 | Dick et al. |
| 2017/0365263 | A1 | 12/2017 | Disch et al. |
| 2017/0365264 | A1 | 12/2017 | Disch et al. |

FOREIGN PATENT DOCUMENTS

| | | | |
|---|---|---|---|
| CN | 101067931 | A | 11/2007 |
| CN | 101253557 | A | 8/2008 |
| CN | 101373594 | A | 2/2009 |
| CN | 101925950 | A | 12/2010 |
| CN | 102105930 | A | 6/2011 |
| CN | 102113051 | A | 6/2011 |
| CN | 102124517 | A | 7/2011 |
| CN | 102177426 | A | 9/2011 |
| CN | 102177543 | A | 9/2011 |
| CN | 102388417 | A | 3/2012 |
| CN | 102648494 | A | 8/2012 |
| CN | 102741831 | A | 10/2012 |
| CN | 102779518 | A | 11/2012 |
| CN | 102859589 | A | 1/2013 |
| CN | 102884574 | A | 1/2013 |
| CN | 107408389 | A | 11/2017 |
| CN | 107430863 | A | 12/2017 |
| DE | 4307688 | A1 | 9/1994 |
| EP | 0241163 | A1 | 10/1987 |
| EP | 0615226 | A2 | 9/1994 |
| EP | 0797324 | A2 | 9/1997 |
| JP | H09200055 | A | 7/1997 |
| JP | 2007515672 | A | 6/2007 |
| JP | 2008505368 | A | 2/2008 |
| JP | 2010020251 | A | 1/2010 |
| JP | 2011507050 | A | 3/2011 |
| JP | 2011509428 | A | 3/2011 |
| JP | 2011527449 | A | 10/2011 |
| JP | 2011527453 | A | 10/2011 |
| JP | 2011528129 | A | 11/2011 |
| JP | 2012505429 | A | 3/2012 |
| JP | 2012521012 | A | 9/2012 |
| JP | 2013508770 | A | 3/2013 |
| JP | 2017508014 | A | 3/2017 |
| JP | 2018511827 | A | 4/2018 |
| RU | 2495503 | C2 | 10/2013 |
| SE | 519981 | C2 | 5/2003 |
| TW | 201009808 | A | 3/2010 |
| TW | 201126509 | A | 8/2011 |
| TW | 201344679 | A | 11/2013 |
| TW | 1435316 | B | 4/2014 |
| TW | 201505024 | A | 2/2015 |
| WO | 0165544 | A1 | 9/2001 |
| WO | 2005055203 | A1 | 6/2005 |
| WO | 2006000952 | A1 | 1/2006 |
| WO | 2006025337 | A1 | 3/2006 |
| WO | 2006070751 | A1 | 7/2006 |
| WO | 2009007639 | A1 | 1/2009 |
| WO | 2009066960 | A1 | 5/2009 |
| WO | 2010003564 | A1 | 1/2010 |
| WO | 2010040522 | A2 | 4/2010 |
| WO | 2010128386 | A1 | 11/2010 |
| WO | 2013156814 | A1 | 10/2013 |
| WO | 2013168414 | A1 | 11/2013 |
| WO | 2014126682 | A1 | 8/2014 |
| WO | 2016142336 | A1 | 9/2016 |
| WO | 2016142337 | A1 | 9/2016 |

OTHER PUBLICATIONS

3GPP TS 26.445 V12.1.0—3rd Generation Partnership Project; Technical Specification Group Services and System Aspects; Codec for Enhanced Voice Services (EVC); Detailed Algorithmic Description (Release 12) (Dec. 2014) (pp. 1-24).

3GPP TS 36.101 V8.0.0 (Dec. 2007), 3rd Generation Partnership Project; Technical Specification Group Radio Access Network; Evolved Universal Terrestrial Radio Access (E-UTRA); User Equipment (UE) radio transmission and reception (Release 8). , Dec. 10, 2014.

(56) References Cited

OTHER PUBLICATIONS

Deming Zhang et al.; High-level description of the Huawei/ETRI candidate for the super—wideband and stereo extensions ofITU-T G.729.1 and G.718. ITU-T WP3/16, 2008.
Magnus Schäfer, Peter Vary, Hierarchical Multi-Channel Audio Coding Based on Time-Domain Linear Prediction, 20th European Signal Processing Conference (EUSIPCO 2012).
EVS Codec Detailed Algorithmic Description (3GPP TS 26.445 version 12.0.0 Release 12). ETSI TS 126 445 V12.0.0 2014.11. , Nov. 2014.
ISO/IEC FDIS 23003-3:2011(E), Information technology—MPEG audio technologies—Part 3: Unified speech and audio coding. ISO/IEC JTC 1/SC 29/WG 11. Sep. 20, 2011.
Information Technology—High Efficiency Coding and Media Delivery in Heterogeneous Environments—Part 3: 3D audio, ISO/IEC DIS 23008-3 , Jul. 25, 2014.
Part 1 of 2—EVS Codec Detailed Algorithmic Description, 3GPP TS 26.445 version 12.0.0 Release 12. ETSI TS 126 445 V12.0.0. Nov. 2014.
Part 2 of 2—EVS Codec Detailed Algorithmic Description, 3GPP TS 26.445 version 12.0.0 Release 12. ETSI TS 126 445 V12.0.0. Nov. 2014.
Lecomte, Jeremie , et al. , "Efficient Cross-Fade Windows for Transitions between LPC-Based and Non-LPC Based Audio Coding" , Presented at the 126th Convention; May 7-10, 2009 Munich, Germany, 1-9.
Neuendorf, Max , et al. , "MPEG United Speech and Audio Coding—The ISO/MPEG Standard for High-Efficiency Audio Coding of All Content Types" , Audio Engineering Society Convention 132. Audio Engineering Society Apr. 2012; pp. 1-22.
Neuendorf, Max , "Study on ISO/IEC 23003-3:201x/DIS of Unified Speech and Audio Coding" , International Organization for Standardisation Organisation Internationale de Normalisation ISO/IEC JTC1/SC29/WG11 Coding of Moving Pictures and Audio N12013 (Mar. 2011), 1-274.
Neuendorf, Max , et al. , "The ISO/MPEG United Speech and Audio Coding Standard—Consistent High Quality for all Content Types and at all Bit Rates", J. Audio Eng. Soc., Vo. 61, No. 12 (Dec. 2013) (pp. 1-22).
Salami, Redwan , et al., "Extended AMR-WB for High-Quality Audio on Mobile Devices" IEEE Communications Magazine; IEEE Service Center; vol. 44; No. 5; doi:10.1109/MCOM.2006.1637952; ISSN 0163-6804; pp. 90-97; XP001546246.
Svedberg, Jonas , et al. , ""High level description of the Ericsson, France Telecom, Matsushita, Motorola, Nokia, Texas Instruments and Voiceage qualification candidate to the Joint G.729.1 and G.718 SWB/stereo extension"," , ITU-T Draft; International Telecommunication Union; Geneva, CH; vol. A.23/16; pp. 1-13; XP017543793.
Tsutsumi, Kimitaka , et al. , "3 GPP Standard audio coding mode EVC realizing further sound quality improvement of VOLTE and exploitation of music" , NTT Docomo Technical Journal, Jan. 1, 2015, vol. 22, No. 4, pp. 6-13.
Zhang, Deming , et al. , "High-level description of the Huawei/ETRI candidate for the super-wideband and stereo extensions of ITU-T G.729.1 and G.718." , ITUT Draft; International Telecommunications Union; Geneva, CH; vol. 23; pp. 1-14; XP017543792.

* cited by examiner

AUDIO ENCODER FOR ENCODING A MULTICHANNEL SIGNAL AND AUDIO DECODER FOR DECODING AN ENCODED AUDIO SIGNAL

CROSS-REFERENCE TO RELATED APPLICATIONS

This application is a continuation of copending U.S. application Ser. No. 16/506,767, filed Jul. 9, 2019, which is incorporated herein by reference in its entirety and in turn is a continuation of copending U.S. application Ser. No. 15/695,668, filed on Sep. 5, 2017, now U.S. Pat. No. 10,388,287, which is incorporated herein by reference in its entirety and in turn is a continuation of copending International Application No. PCT/EP2016/054775, filed Mar. 7, 2016, which is incorporated herein by reference in its entirety, and additionally claims priority from European Applications Nos. EP 15 158 233.5, filed Mar. 9, 2015, and EP 15 172 599.1, filed Jun. 17, 2015, each of which is incorporated herein in its entirety by this reference thereto.

The present invention relates to an audio encoder for encoding a multichannel audio signal and an audio decoder for decoding an encoded audio signal. Embodiments relate to multichannel coding in LPD mode using a filterbank for the multichannel processing (DFT) which is not the one used in for bandwidth extension.

BACKGROUND OF THE INVENTION

The perceptual coding of audio signals for the purpose of data reduction for efficient storage or transmission of these signals is a widely used practice. In particular, when highest efficiency is to be achieved, codecs that are closely adapted to the signal input characteristics are used. One example is the MPEG-D USAC core codec that can be configured to predominantly use ACELP (Algebraic Code-Excited Linear Prediction) coding on speech signals, TCX (Transform Coded Excitation) on background noise and mixed signals, and AAC (Advanced Audio Coding) on music content. All three internal codec configurations can be instantly switched in a signal adaptive way in response to the signal content.

Moreover, joint multichannel coding techniques (Mid/Side coding, etc.) or, for highest efficiency, parametric coding techniques are employed. Parametric coding techniques basically aim at the recreation of a perceptual equivalent audio signal rather than a faithful reconstruction of a given waveform. Examples encompass noise filling, bandwidth extension and spatial audio coding.

When combining a signal adaptive core coder and either joint multichannel coding or parametric coding techniques in state of the art codecs, the core codec is switched to match the signal characteristic, but the choice of multichannel coding techniques, such as M/S-Stereo, spatial audio coding or parametric stereo, remain fixed and independent of the signal characteristics. These techniques are usually employed to the core codec as a pre-processor to the core encoder and a post-processor to the core decoder, both being ignorant to the actual choice of core codec.

On the other hand, the choice of the parametric coding techniques for the bandwidth extension is sometimes made signal dependent. For example techniques applied in the time domain are more efficient for the speech signals while a frequency domain processing is more relevant for other signals. In such a case, the adopted multichannel coding techniques need to be compatible with the both types of bandwidth extension techniques.

Relevant topics in the state-of-art comprise:

- PS and MPS as a pre-/post processor to the MPEG-D USAC core codec
- MPEG-D USAC Standard
- MPEG-H 3D Audio Standard In MPEG-D USAC, a switchable core coder is described. However, in USAC, multichannel coding techniques are defined as a fixed choice that is common to entire core coder, independent of its internal switch of coding principles being ACELP or TCX ("LPD"), or AAC ("FD"). Therefore, if a switched core codec configuration is desired, the codec is limited to use parametric multichannel coding (PS) throughout for the entire signal. However, for coding e.g. music signals it would have been more appropriate to rather use a joint stereo coding, which can switch dynamically between L/R (left/right) and M/S (mid/side) scheme per frequency band and per frame.

SUMMARY

According to an embodiment, an audio encoder for encoding a multichannel signal may have: a downmixer for downmixing the multichannel signal to obtain a downmix signal, wherein the downmixer is configured as an active downmixer or a passive downmixer; a linear prediction domain core encoder for encoding the downmix signal, wherein the downmix signal has a low band and a high band, wherein the linear prediction domain core encoder is configured to apply a bandwidth extension processing for parametrically encoding the high band; a filterbank for generating a spectral representation of the multichannel signal; and a joint multichannel encoder configured to process the spectral representation having the low band and the high band of the multichannel signal to generate multichannel information.

According to another embodiment, an audio decoder for decoding an encoded audio signal having a core encoded signal, bandwidth extension parameters, and multichannel information may have: a linear prediction domain core decoder for decoding the core encoded signal to generate a mono signal; an analysis filterbank to convert the mono signal into a spectral representation being partitioned into non-uniform parameter bands; a multichannel decoder for generating a first channel spectrum and a second channel spectrum from the spectral representation of the mono signal and the multichannel information; and a synthesis filterbank processor for synthesis filtering the first channel spectrum to obtain a first channel signal and for synthesis filtering the second channel spectrum to obtain a second channel signal.

According to another embodiment, a method for encoding a multichannel signal may have the steps of: downmixing the multichannel signal to obtain a downmix signal, wherein the downmixing includes active downmixing or passive downmixing; encoding the downmix signal, wherein the downmix signal includes a low band and a high band, wherein the encoding the downmix signal includes applying a bandwidth extension processing for parametrically encoding the high band; generating a spectral representation of the multichannel signal; and processing the spectral representation including the low band and the high band of the multichannel signal to generate multichannel information.

According to another embodiment, a method of decoding an encoded audio signal, having a core encoded signal, bandwidth extension parameters, and multichannel information, may have the steps of: decoding the core encoded signal to generate a mono signal; converting the mono signal into a spectral representation being partitioned into non-uniform parameter bands; generating a first channel spectrum and a second channel spectrum from the spectral representation of the mono signal and the multichannel information; and synthesis filtering the first channel spectrum to obtain a first channel signal and synthesis filtering the second channel spectrum to obtain a second channel signal.

Another embodiment may have a non-transitory digital storage medium having a computer program stored thereon to perform the method for encoding a multichannel signal, the method having the steps of: downmixing the multichannel signal to obtain a downmix signal, encoding the downmix signal, wherein the downmix signal includes a low band and a high band, wherein the encoding the downmix signal includes applying a bandwidth extension processing for parametrically encoding the high band; generating a spectral representation of the multichannel signal; and processing the spectral representation including the low band and the high band of the multichannel signal to generate multichannel information, when said computer program is run by a computer.

Another embodiment may have a non-transitory digital storage medium having a computer program stored thereon to perform the method of decoding an encoded audio signal, including a core encoded signal, bandwidth extension parameters, and multichannel information, which method may have the steps of: decoding the core encoded signal to generate a mono signal; converting the mono signal into a spectral representation; generating a first channel spectrum and a second channel spectrum from the spectral representation of the mono signal and the multichannel information; and synthesis filtering the first channel spectrum to obtain a first channel signal and synthesis filtering the second channel spectrum to obtain a second channel signal, when said computer program is run by a computer.

The present invention is based on the finding that a (time domain) parametric encoder using a multichannel coder is advantageous for parametric multichannel audio coding. The multichannel coder may be a multichannel residual coder which may reduce a bandwidth for transmission of the coding parameters compared to a separate coding for each channel. This may be advantageously used, for example, in combination with a frequency domain joint multichannel audio coder. The time domain and frequency domain joint multichannel coding techniques may be combined, such that for example a frame-based decision can direct a current frame to a time-based or a frequency-based encoding period. In other words, embodiments show an improved concept for combining a switchable core codec using joint multichannel coding and parametric spatial audio coding into a fully switchable perceptual codec that allows for using different multichannel coding techniques in dependence on the choice of a core coder. This is advantageous, since, in contrast to already existing methods, embodiments show a multichannel coding technique which can be switched instantly alongside with a core coder and therefore being closely matched and adapted to the choice of the core coder. Therefore, the depicted problems that appear due to a fixed choice of multichannel coding techniques may be avoided. Moreover, a fully-switchable combination of a given core coder and its associated and adapted multichannel coding technique is enabled. Such a coder, for example an AAC (Advanced Audio Coding) using L/R or M/S stereo coding, is for example capable of encoding a music signal in the frequency domain (FD) core coder using a dedicated joint stereo or multichannel coding, e.g. M/S stereo. This decision may be applied separately for each frequency band in each audio frame. In case of e.g. a speech signal, the core coder may instantly switch to a linear predictive decoding (LPD) core coder and its associated different, for example parametric stereo coding techniques.

Embodiments show a stereo processing that is unique to the mono LPD path and a stereo signal-based seamless switching scheme that combines the output of the stereo FD path with that from the LPD core coder and its dedicated stereo coding. This is advantageous, since an artifact-free seamless codec switching is enabled.

Embodiments relate to an encoder for encoding a multichannel signal. The encoder comprises a linear prediction domain encoder and a frequency domain encoder. Furthermore, the encoder comprises a controller for switching between the linear prediction domain encoder and the frequency domain encoder. Moreover, the linear prediction domain encoder may comprise a downmixer for downmixing the multichannel signal to obtain a downmix signal, a linear prediction domain core encoder for encoding the downmix signal and a first multichannel encoder for generating first multichannel information from the multichannel signal. The frequency domain encoder comprises a second joint multichannel encoder for generating second multichannel information from the multichannel signal, wherein the second multichannel encoder is different from the first multichannel encoder. The controller is configured such that a portion of the multichannel signal is represented either by an encoded frame of the linear prediction domain encoder or by an encoded frame of the frequency domain encoder. The linear prediction domain encoder may comprise an ACELP core encoder and, for example, a parametric stereo coding algorithm as a first joint multichannel encoder. The frequency domain encoder may comprise, for example, an AAC core encoder using for example an L/R or M/S processing as a second joint multichannel encoder. The controller may analyze the multichannel signal regarding, for example, frame characteristics like e.g. speech or music and to decide for each frame or a sequence of frames, or a part of the multichannel audio signal whether the linear prediction domain encoder or the frequency domain encoder shall be used for encoding this part of the multichannel audio signal.

Embodiments further show an audio decoder for decoding an encoded audio signal. The audio decoder comprises a linear prediction domain decoder and a frequency domain decoder. Furthermore, the audio decoder comprises a first joint multichannel decoder for generating a first multichannel representation using an output of the linear prediction domain decoder and using a multichannel information and a second multichannel decoder for generating a second multichannel representation using an output of the frequency domain decoder and a second multichannel information. Furthermore, the audio decoder comprises a first combiner for combining the first multichannel representation and the second multichannel representation to obtain a decoded audio signal. The combiner may perform the seamless, artifact-free switching between the first multichannel representation being, for example, a linear predicted multichannel audio signal and the second multichannel representation being, for example, a frequency domain decoded multichannel audio signal.

Embodiments show a combination of ACELP/TCX coding in an LPD path with a dedicated stereo coding and independent AAC stereo coding in a frequency domain path within a switchable audio coder. Furthermore, embodiments show a seamless instant switching between LPD and FD stereo, wherein further embodiments relate to an independent choice of joint multichannel coding for different signal content types. For example, for speech that is predominantly coded using LPD path, a parametric stereo is used, whereas for music that is coded in the FD path a more adaptive stereo coding is used, which can switch dynamically between L/R and M/S scheme per frequency band and per frame.

According to embodiments, for speech that is predominantly coded using LPD path, and that is usually located in the center of the stereo image, a simple parametric stereo is appropriate, whereas music that is coded in the FD path usually has a more sophisticated spatial distribution and can profit from a more adaptive stereo coding, which can switch dynamically between L/R and M/S scheme per frequency band and per frame.

Further embodiments show the audio encoder comprising a downmixer (12) for downmixing the multichannel signal to obtain a downmix signal, a linear prediction domain core encoder for encoding the downmix signal, a filterbank for generating a spectral representation of the multichannel signal and joint multichannel encoder for generating multichannel information from the multichannel signal. The downmix signal has a low band and a high band, wherein the linear prediction domain core encoder is configured to apply a bandwidth extension processing for parametrically encoding the high band. Moreover, the multichannel encoder is configured to process the spectral representation comprising the low band and the high band of the multichannel signal. This is advantageous since each parametric coding can use its optimal time-frequency decomposition for getting its parameters. This may be implemented e.g. using a combination of ACELP (Algebraic Code-Excited Linear Prediction) plus TDBWE (Time Domain Bandwidth Extension), where ACELP may encode a low band of the audio signal and TDBWE may encode a high band of the audio signal, and parametric multichannel coding with an external filterbank (e.g. DFT). This combination is particularly efficient since it is known that the best bandwidth extension for speech should be in the time domain and the multichannel processing in the frequency domain. Since ACELP+TDBWE do not have any time-frequency converter, an external filterbank or transformation like the DFT is advantageous. Moreover, the framing of the multichannel processor may the same as the one used in ACELP. Even if the multichannel processing is done in the frequency domain, the time resolution for computing its parameters or downmixing should be ideally close to or even equal to the framing of ACELP.

The described embodiments are beneficial, since an independent choice of joint multichannel coding for different signal content types may be applied.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments of the invention will be described in further detail. Elements shown in the respective figures having the same or similar functionality will have associated therewith the same reference signs.

Figure 1:
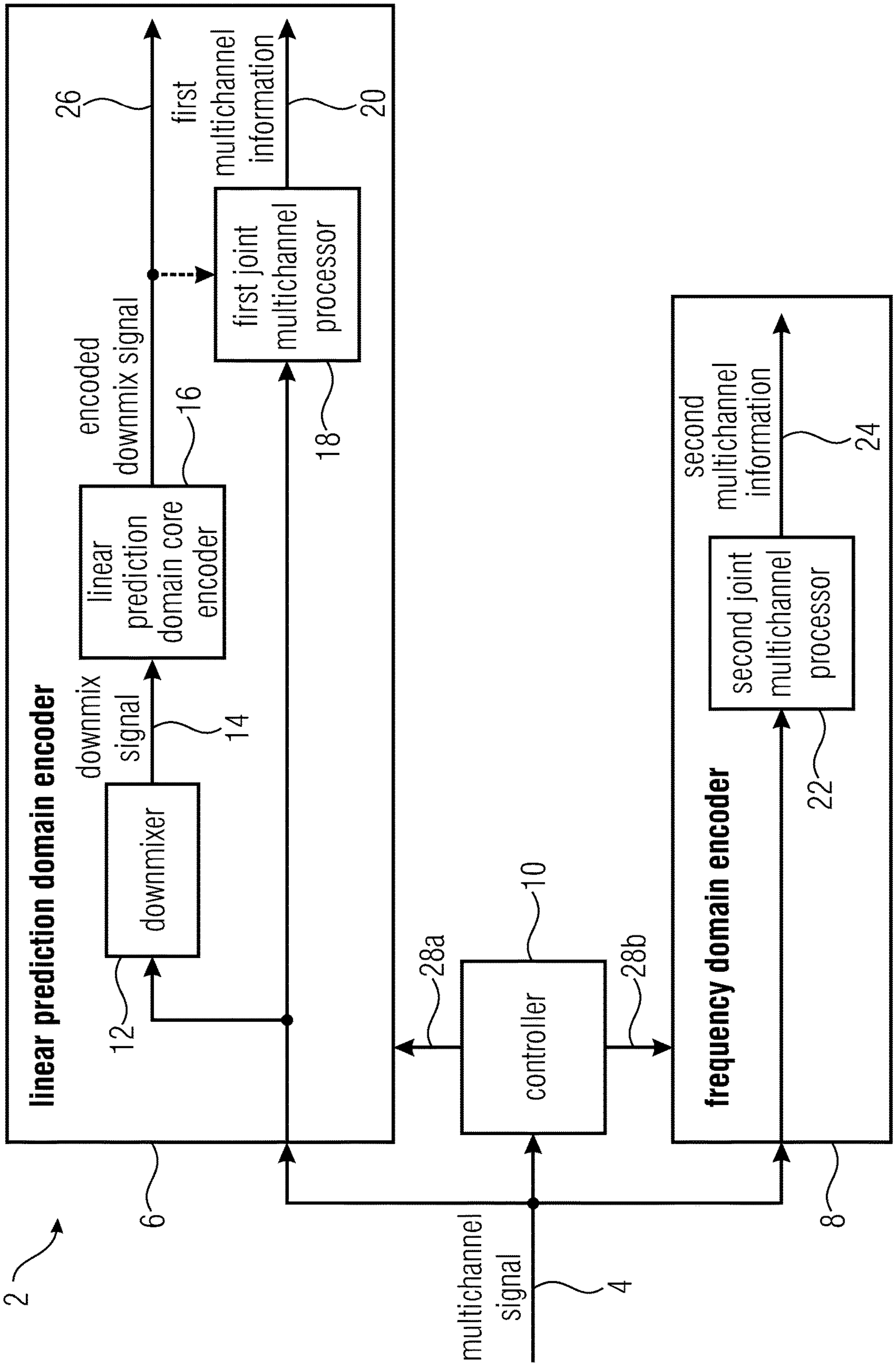
FIG. 1 shows a schematic block diagram of an encoder for encoding a multichannel audio signal.

FIG. 1 shows a schematic block diagram of an audio encoder 2 for encoding a multichannel audio signal 4. The audio encoder comprises a linear prediction domain encoder 6, a frequency domain encoder 8, and a controller 10 for switching between the linear prediction domain encoder 6 and the frequency domain encoder 8. The controller may analyze the multichannel signal and decide for portions of the multichannel signal whether a linear prediction domain encoding or a frequency domain encoding is advantageous. In other words, the controller is configured such that a portion of the multichannel signal is represented either by an encoded frame of the linear prediction domain encoder or by an encoded frame of the frequency domain encoder. The linear prediction domain encoder comprises a downmixer 12 for downmixing the multichannel signal 4 to obtain a downmixed signal 14. The linear prediction domain encoder further comprises a linear prediction domain core encoder 16 for encoding the downmix signal and furthermore, the linear prediction domain encoder comprises a first joint multichannel encoder 18 for generating first multichannel information 20, comprising e.g. ILD (interaural level difference) and/or IPD (interaural phase difference) parameters, from the multichannel signal 4. The multichannel signal may be, for example, a stereo signal wherein the downmixer converts the stereo signal to a mono signal. The linear prediction domain core encoder may encode the mono signal, wherein the first joint multichannel encoder may generate the stereo information for the encoded mono signal as first multichannel information. The frequency domain encoder and the controller are optional when compared to the further aspect described with respect to FIG. 10 and FIG. 11. However, for signal adaptive switching between time domain and frequency domain encoding, using the frequency domain encoder and the controller is advantageous.

Moreover, the frequency domain encoder 8 comprises a second joint multichannel encoder 22 for generating second multichannel information 24 from the multichannel signal 4, wherein the second joint multichannel encoder 22 is different from the first multichannel encoder 18. However, the second joint multichannel processor 22 obtains the second multichannel information allowing a second reproduction quality which is higher than the first reproduction quality of the first multichannel information obtained by the first multichannel encoder for signals which are better coded by the second encoder.

In other words, according to embodiments, the first joint multichannel encoder 18 is configured to generate the first multichannel information 20 allowing a first reproduction quality, wherein the second joint multichannel encoder 22 is configured to generate the second multichannel information 24 allowing a second reproduction quality, wherein the second reproduction quality is higher than the first reproduction quality. This is at least relevant for signals, such as e.g. speech signals, which are better coded by the second multichannel encoder.

Therefore, the first multichannel encoder may be a parametric joint multichannel encoder comprising for example a stereo prediction coder, a parametric stereo encoder or a rotation-based parametric stereo encoder. Moreover, the second joint multichannel encoder may be waveform-preserving such as, for example, a band-selective switch to mid/side or left/right stereo coder. As depicted in FIG. 1, the encoded downmix signal 26 may be transmitted to an audio decoder and optionally serve the first joint multichannel processor where, for example, the encoded downmix signal may be decoded and a residual signal from the multichannel signal before encoding and after decoding the encoded signal may be calculated to improve the decoded quality of the encoded audio signal at the decoder side. Furthermore, the controller 10 may use control signals 28*a*, 28*b* to control the linear prediction domain encoder and the frequency domain encoder, respectively, after determining the suitable encoding scheme for the current portion of the multichannel signal.

Figure 2:
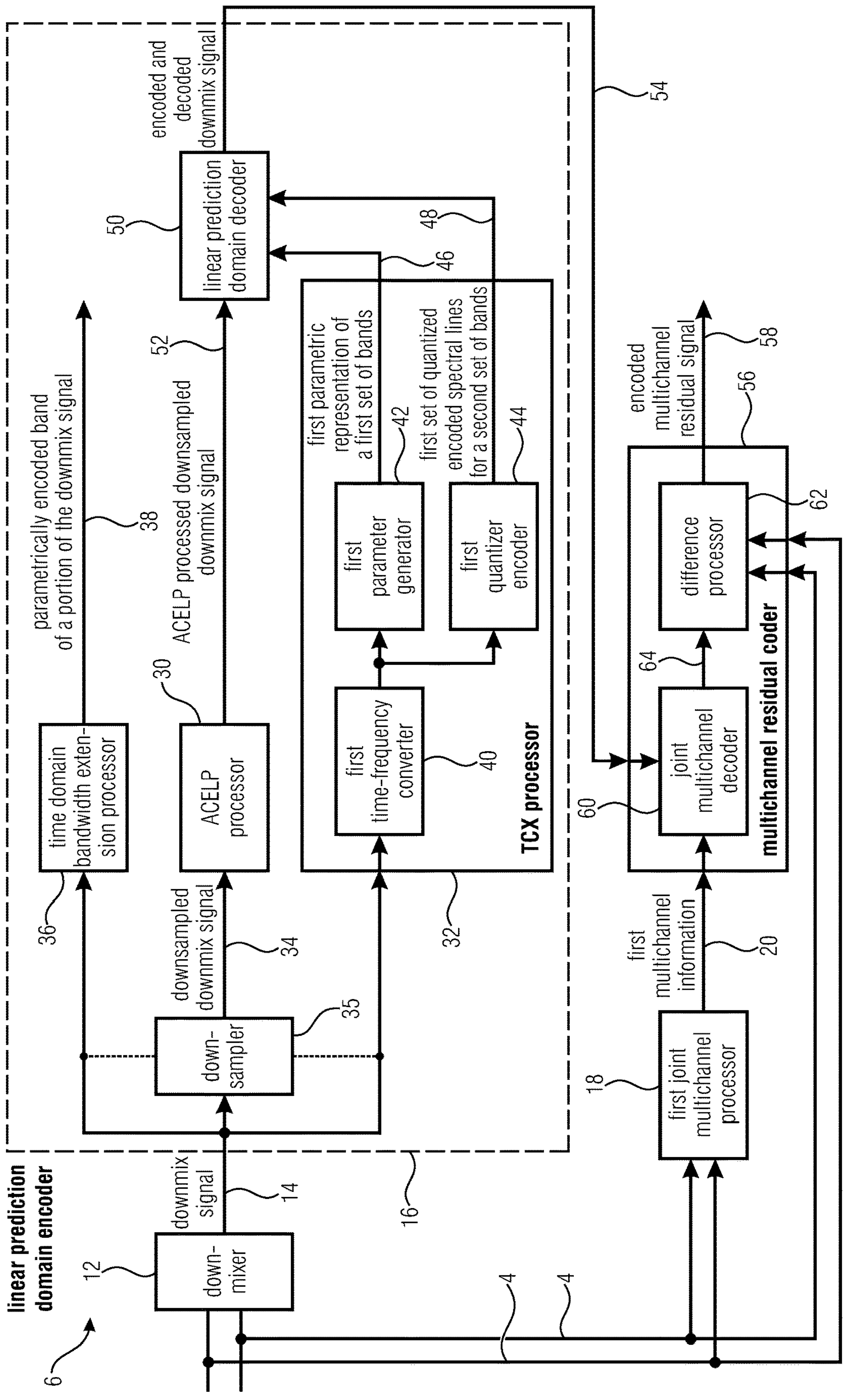
FIG. 2 shows a schematic block diagram of a linear prediction domain encoder according to an embodiment.

FIG. 2 shows a block diagram of the linear prediction domain encoder 6 according to an embodiment. Input to the linear prediction domain encoder 6 is the downmix signal 14 downmixed by downmixer 12. Furthermore, the linear prediction domain encoder comprises an ACELP processor 30 and a TCX processor 32. The ACELP processor 30 is configured to operate on a downsampled downmix signal 34, which may be downsampled by downsampler 35. Furthermore, a time domain bandwidth extension processor 36 may parametrically encode a band of a portion of the downmix signal 14, which is removed from the downsampled downmix signal 34 which is input into the ACELP processor 30. The time domain bandwidth extension processor 36 may output a parametrically encoded band 38 of a portion of the downmix signal 14. In other words, the time domain bandwidth extension processor 36 may calculate a parametric representation of frequency bands of the downmix signal 14 which may comprise higher frequencies compared to the cutoff frequency of the downsampler 35. Therefore, the downsampler 35 may have the further property to provide those frequency bands higher than the cutoff frequency of the downsampler to the time domain bandwidth extension processor 36 or, to provide the cutoff frequency to the time domain bandwidth extension (TD-BWE) processor to enable the TD-BWE processor 36 to calculate the parameters 38 for the correct portion of the downmix signal 14.

Furthermore, the TCX processor is configured to operate on the downmix signal which is, for example, not downsampled or downsampled by a degree smaller than the downsampling for the ACELP processor. A downsampling by a degree smaller than the downsampling of the ACELP processor may be a downsampling using a higher cutoff frequency, wherein a larger number of bands of the downmix signal are provided to the TCX processor when compared to the downsampled downmix signal 35 being input to the ACELP processor 30. The TCX processor may further comprise a first time-frequency converter 40, such as for example an MDCT, a DFT, or a DCT. The TCX processor 32 may further comprise a first parameter generator 42 and a first quantizer encoder 44. The first parameter generator 42, for example an intelligent gap filling (IGF) algorithm may calculate a first parametric representation of a first set of bands 46, wherein the first quantizer encoder 44, for example using a TCX algorithm to calculate a first set of quantized encoded spectral lines 48 for a second set of bands. In other words, the first quantizer encoder may parametrically encode relevant bands, such as e.g. tonal bands, of the inbound signal wherein the first parameter generator applies e.g. an IGF algorithm to the remaining bands of the inbound signal to further reduce the bandwidth of the encoded audio signal.

The linear prediction domain encoder 6 may further comprise a linear prediction domain decoder 50 for decoding the downmix signal 14, for example represented by the ACELP processed downsampled downmix signal 52 and/or the first parametric representation of a first set of bands 46 and/or the first set of quantized encoded spectral lines 48 for a second set of bands. Output of the linear prediction domain decoder 50 may be an encoded and decoded downmix signal 54. This signal 54 may be input to a multichannel residual coder 56, which may calculate and encode a multichannel residual signal 58 using the encoded and decoded downmixed signal 54, wherein the encoded multichannel residual signal represents an error between a decoded multichannel representation using the first multichannel information and the multichannel signal before downmixing. Therefore, the multichannel residual coder 56 may comprise a joint encoder-side multichannel decoder 60 and a difference processor 62. The joint encoder-side multichannel decoder 60 may generate a decoded multichannel signal using the first multichannel information 20 and the encoded and decoded downmix signal 54, wherein the difference processor can form a difference between the decoded multichannel signal 64 and the multichannel signal 4 before downmixing to obtain the multichannel residual signal 58. In other words, the joint encoder-side multichannel decoder within the audio encoder may perform a decoding operation, which is advantageously the same decoding operation performed on decoder side. Therefore, the first joint multichannel information, which can be derived by the audio decoder after transmission, is used in the joint encoder-side multichannel decoder for decoding the encoded downmix signal. The difference processor 62 may calculate the difference between the decoded joint multichannel signal and the original multichannel signal 4. The encoded multichannel residual signal 58 may improve the decoding quality of the audio decoder, since the difference between the decoded signal and the original signal due to for example the parametric encoding, may be reduced by the knowledge of the difference between these two signals. This enables the first joint multichannel encoder to operate in such a way that multichannel information for a full bandwidth of the multichannel audio signal is derived.

Moreover, the downmix signal 14 may comprise a low band and a high band, wherein the linear prediction domain encoder 6 is configured to apply a bandwidth extension processing, using for example the time domain bandwidth extension processor 36 for parametrically encoding the high band, wherein the linear prediction domain decoder 6 is configured to obtain, as the encoded and decoded downmix signal 54, only a low band signal representing the low band of the downmix signal 14, and wherein the encoded multichannel residual signal only has frequencies within the low band of the multichannel signal before downmixing. In other words, the bandwidth extension processor may calculate bandwidth extension parameters for the frequency bands higher than a cutoff frequency, wherein the ACELP processor encodes the frequencies below the cutoff frequency. The decoder is therefore configured to reconstruct the higher frequencies based on the encoded low band signal and the bandwidth parameters 38.

According to further embodiments, the multichannel residual coder 56 may calculate a side signal and wherein the downmix signal is a corresponding mid signal of a M/S multichannel audio signal. Therefore, the multichannel residual coder may calculate and encode a difference of a calculated side signal, which may be calculated from the full band spectral representation of the multichannel audio signal obtained by filterbank 82, and a predicted side signal of a multiple of the encoded and decoded downmix signal 54, wherein the multiple may be represented by a prediction information becomes part of the multichannel information. However, the downmix signal comprises only the low band signal. Therefore, the residual coder may further calculate a residual (or side) signal for the high band. This may be performed e.g. by simulating time domain bandwidth extension, as it is done in the linear prediction domain core encoder, or by predicting the side signal as a difference between the calculated (full band) side signal and the calculated (full band) mid signal, wherein a prediction factor is configured to minimize the difference between both signals.

Figure 3:
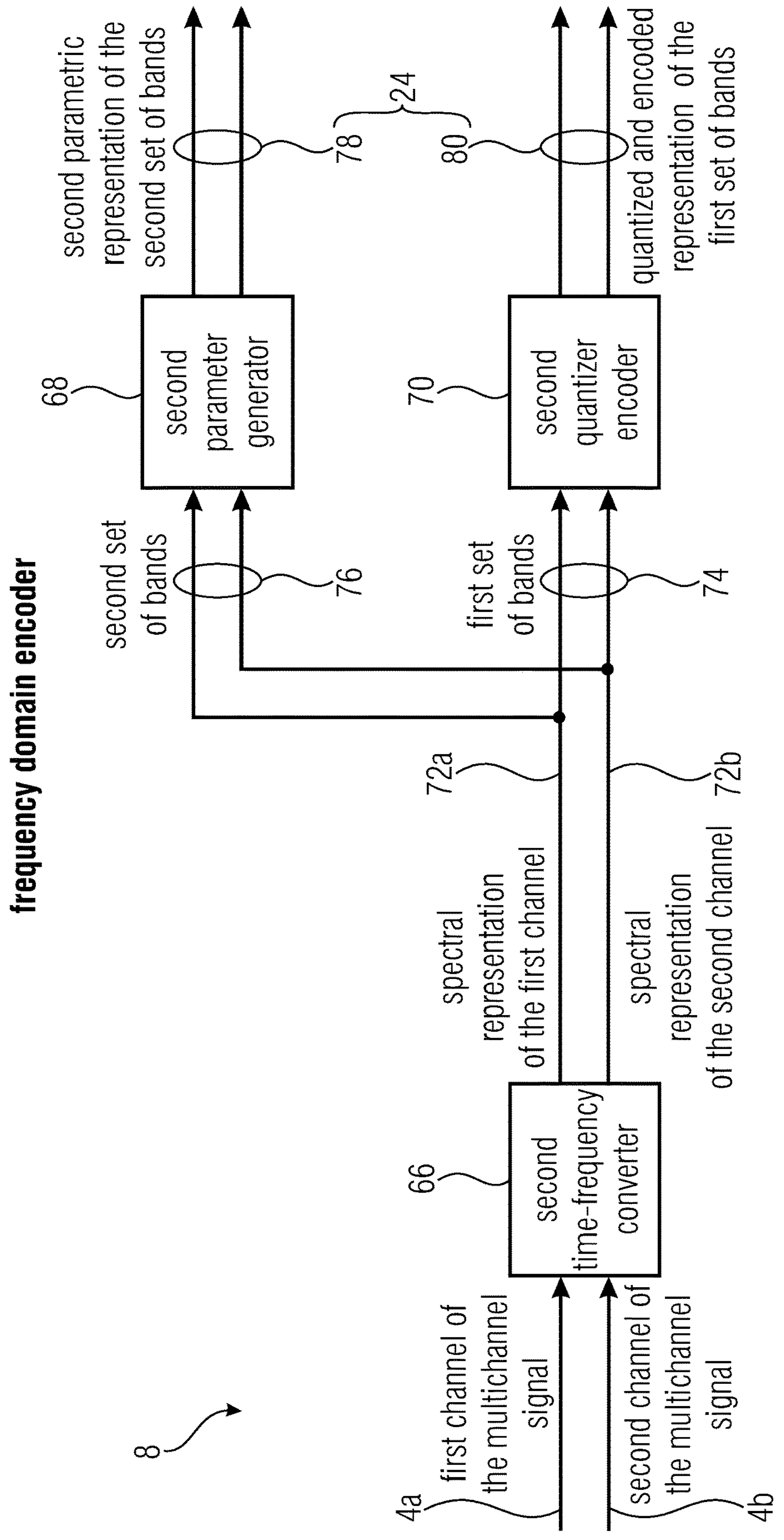
FIG. 3 shows a schematic block diagram of a frequency domain encoder according to an embodiment.

FIG. 3 shows a schematic block diagram of the frequency domain encoder 8 according to an embodiment. The frequency domain encoder comprises a second time-frequency converter 66, a second parameter generator 68 and a second quantizer encoder 70. The second time-frequency converter 66 may convert a first channel 4*a* of the multichannel signal and a second channel 4*b* of the multichannel signal into a spectral representation 72*a*, 72*b*. The spectral representation of the first channel and the second channel 72*a*, 72*b* may be analyzed and each split up into a first set of bands 74 and a second set of bands 76. Therefore, the second parameter generator 68 may generate a second parametric representation 78 of the second set of bands 76, wherein the second quantizer encoder may generate a quantized and encoded representation 80 of the first set of bands 74. The frequency domain encoder, or more specifically, the second time-frequency converter 66 may perform, for example, an MDCT operation for the first channel 4*a* and the second channel 4*b*, wherein the second parameter generator 68 may perform an intelligent gap filling algorithm and the second quantizer encoder 70 may perform, for example an AAC operation. Therefore, as already described with respect to the linear prediction domain encoders, the frequency domain encoder is also capable to operate in such a way that multichannel information for a full bandwidth of the multichannel audio signal is derived.

Figure 4:
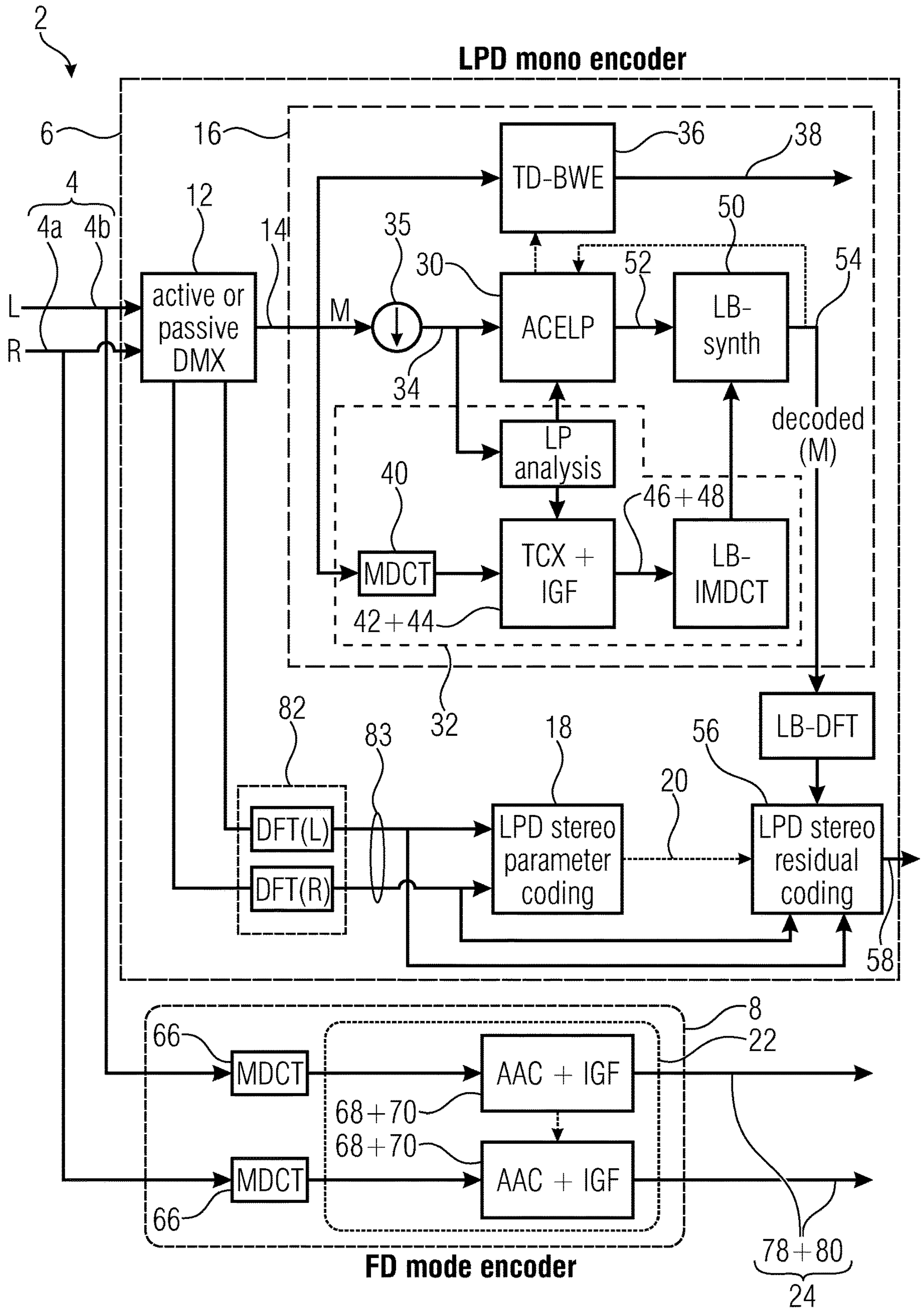
FIG. 4 shows a schematic block diagram of an audio encoder according to an embodiment.

FIG. 4 shows a schematic block diagram of the audio encoder 2 according to an embodiment. The LPD path 16 consists of a joint stereo or multichannel encoding that contains an "active or passive DMX" downmix calculation 12, indicating that LPD downmix can be active ("frequency selective") or passive ("constant mixing factors") as depicted in FIG. 5. The downmix is further coded by a switchable mono ACELP/TCX core that is supported by either TD-BWE or IGF modules. Note that the ACELP operates on downsampled input audio data 34. Any ACELP initialization due to switching may be performed on downsampled TCX/IGF output.

Since ACELP does not contain any internal time-frequency decomposition, the LPD stereo coding adds an extra complex modulated filterbank by means of an analysis filterbank 82 before the LP coding and a synthesis filterbank after LPD decoding. In the embodiment, an oversampled DFT with a low overlapping region is employed. However, in other embodiments, any oversampled time-frequency decomposition with similar temporal resolution can be used. The stereo parameters may then be computed in the frequency domain.

The parametric stereo coding is performed by the "LPD stereo parameter coding" block 18 which outputs LPD stereo parameters 20 to the bitstream. Optionally, the following block "LPD stereo residual coding" adds a vector-quantized lowpass downmix residual 58 to the bitstream.

The FD path 8 is configured to have its own internal joint stereo or multichannel coding. For joint stereo coding it reuses its own critically-sampled and real-valued filterbank 66, namely e.g. the MDCT.

The signals provided to the decoder may be for example multiplexed to a single bitstream. The bitstream may comprise the encoded downmix signal 26 which may further comprise at least one of the parametrically encoded time domain bandwidth extended band 38, the ACELP processed downsampled downmix signal 52, the first multichannel information 20, the encoded multichannel residual signal 58, the first parametric representation of a first set of bands 46, the first set of quantized encoded spectral lines for a second set of bands 48, and the second multichannel information 24 comprising the quantized and encoded representation of the first set of bands 80 and the second parametric representation of the first set of bands 78.

Embodiments show an improved method for combining a switchable core codec, joint multichannel coding and parametric spatial audio coding into a fully switchable perceptual codec that allows for using different multichannel coding techniques in dependence on the choice of the core coder. Specifically, within a switchable audio coder, native frequency domains stereo coding is combined with ACELP/TCX based linear predictive coding having its own dedicated independent parametric stereo coding.

Figure 5A:
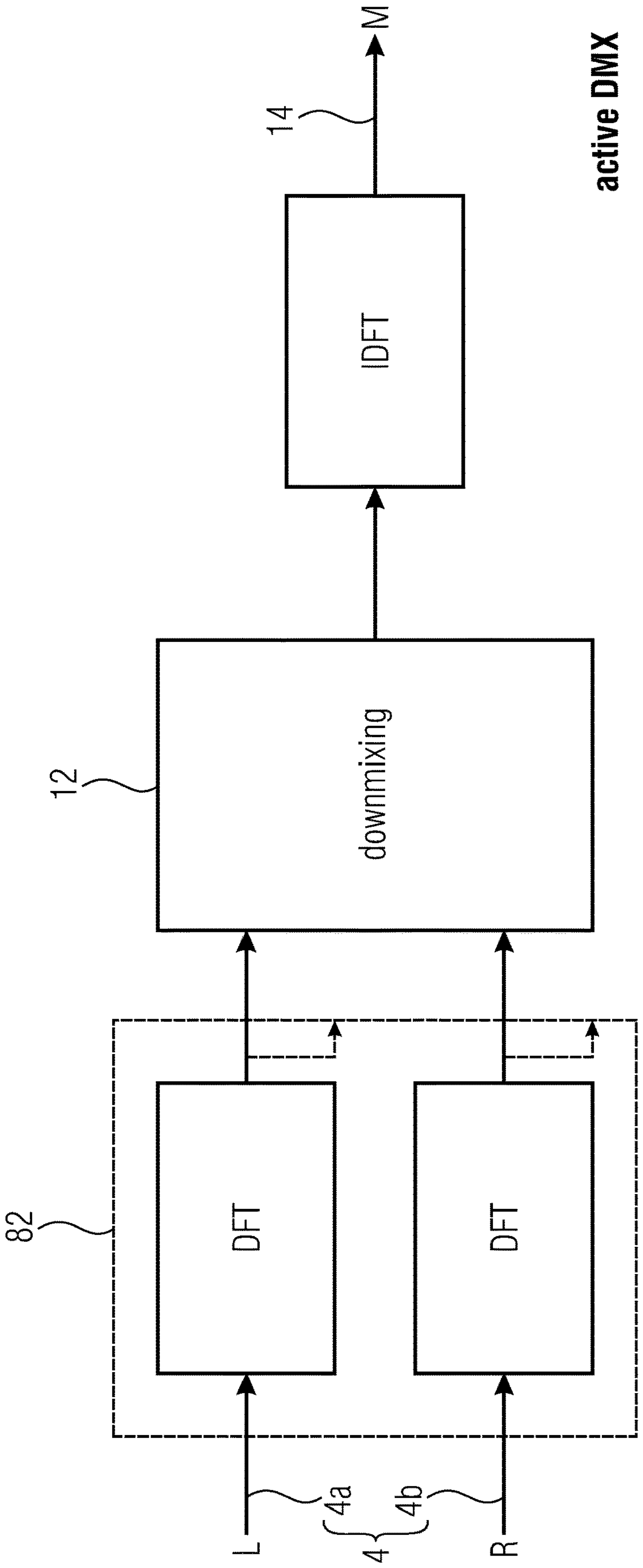
FIG. 5*a* shows a schematic block diagram of an active downmixer according to an embodiment.
Figure 5B:
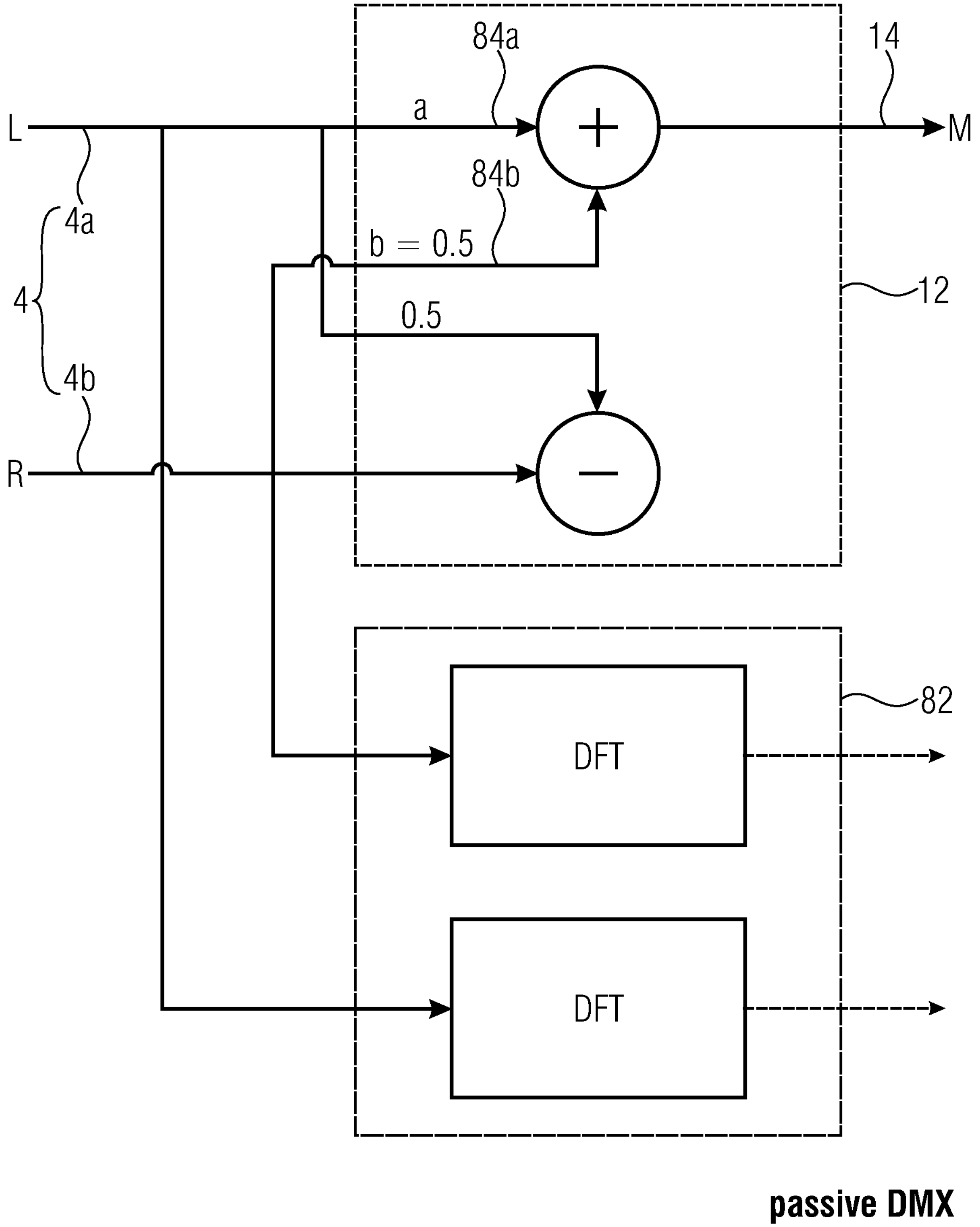
FIG. 5*b* shows a schematic block diagram of a passive downmixer according to an embodiment.

FIG. 5*a* and FIG. 5*b* show an active and a passive downmixer, respectively, according to embodiments. The active downmixer operates in the frequency domain using for example a time frequency converter 82 for transforming the time domain signal 4 into a frequency domain signal. After downmixing, a frequency-time conversion, for example an IDFT, may convert the downmixed signal from the frequency domain into the downmix signal 14 in the time domain.

FIG. 5*b* shows a passive downmixer 12 according to an embodiment. The passive downmixer 12 comprises an adder, wherein the first channel 4*a* and the first channel 4*b* are combined after weighting using a weight a 84*a* and a weight b 84*b*, respectively. Moreover, the first channel for 4a and the second channel 4*b* may be input to the time-frequency converter 82 before transmission to the LPD stereo parametric coding.

In other words, the downmixer is configured to convert the multichannel signal into a spectral representation and wherein the downmixing is performed using the spectral representation or using a time domain representation, and wherein the first multichannel encoder is configured to use the spectral representation to generate separate first multichannel information for individual bands of the spectral representation.

Figure 6:
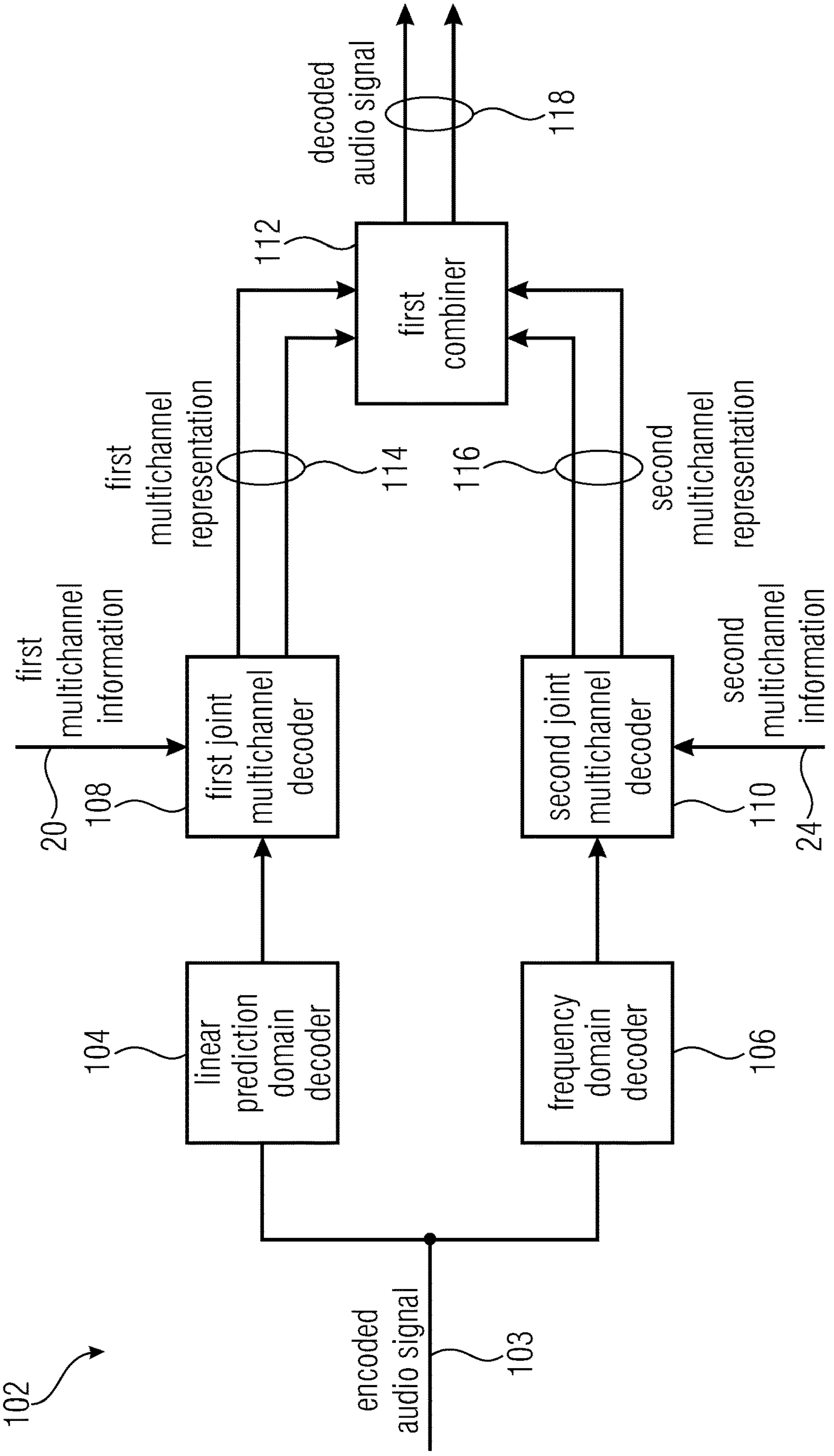
FIG. 6 shows a schematic block diagram of a decoder for decoding an encoded audio signal.

FIG. 6 shows a schematic block diagram of an audio decoder 102 for decoding an encoded audio signal 103 according to an embodiment. The audio decoder 102 comprises a linear prediction domain decoder 104, a frequency domain decoder 106, a first joint multichannel decoder 108, a second multichannel decoder 110, and a first combiner 112. The encoded audio signal 103, which may be the multiplexed bitstream of the previously described encoder portions, such as for example frames of the audio signal, may be decoded by joint multichannel decoder 108 using the first multichannel information 20 or, by the frequency domain decoder 106 and multichannel decoded by the second joint multichannel decoder 110 using the second multichannel information 24. The first joint multichannel decoder may output a first multichannel representation 114 and output of the second joint multichannel decoder 110 may be a second multichannel representation 116.

In other words, the first joint multichannel decoder 108 generates a first multichannel representation 114 using an output of the linear prediction domain encoder and using a first multichannel information 20. The second multichannel decoder 110 generates a second multichannel representation 116 using an output of the frequency domain decoder and a second multichannel information 24. Furthermore, the first combiner combines the first multichannel representation 114 and the second multichannel representation 116, for example frame-based, to obtain a decoded audio signal 118. Moreover, the first joint multichannel decoder 108 may be a parametric joint multichannel decoder, for example using a complex prediction, a parametric stereo operation or a rotation operation. The second joint multichannel decoder 110 may be a waveform-preserving joint multichannel decoder using for example a band-selective switch to mid/side or left/right stereo decoding algorithm.

Figure 7:
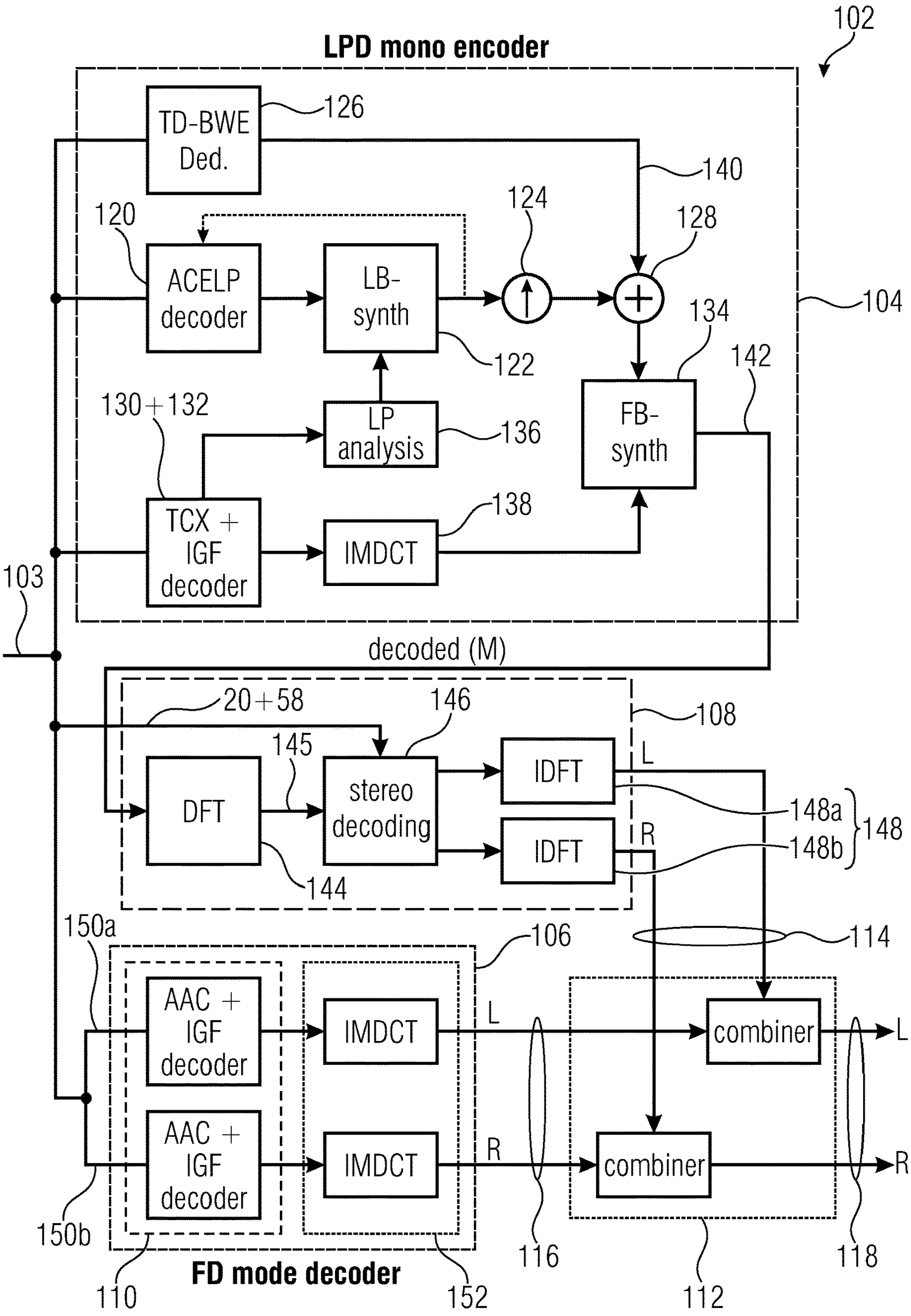
FIG. 7 shows a schematic block diagram of a decoder according to an embodiment.

FIG. 7 shows a schematic block diagram of a decoder 102 according to a further embodiment. Herein, a linear prediction domain decoder 102 comprises an ACELP decoder 120, a low band synthesizer 122, an upsampler 124, a time domain bandwidth extension processor 126, or a second combiner 128 for combining an upsampled signal and a bandwidth extended signal. Furthermore, the linear prediction domain decoder may comprise a TCX decoder 132 and an intelligent gap-filling processor 132, which are depicted as one block in FIG. 7. Moreover, the linear prediction domain decoder 102 may comprise a full band synthesis processor 134 for combining an output of the second combiner 128 and the TCX decoder 130 and the IGF processor 132. As already shown with respect to the encoder, the time domain bandwidth extension processor 126, the ACELP decoder 120, and the TCX decoder 130 work in parallel to decode the respective transmitted audio information.

A cross-path 136 may be provided for initializing the low band synthesizer using information derived from a low band spectrum-time-conversion, using for example frequency-time-converter 138 from the TCX decoder 130 and the IGF processor 132. Referring to a model of the vocal tract, the ACELP data may model the shape of the vocal tract wherein the TCX data may model an excitation of the vocal tract. The cross path 136 represented by a low band frequency-time converter such as for example an IMDCT decoder, enables the low band synthesizer 122 to use the shape of the vocal tract and the present excitation to recalculate or decode the encoded low band signal. Furthermore, the synthesized low band is upsampled by upsampler 124 and combined, using e.g. the second combiner 128, with the time domain bandwidth extended high bands 140 to, for example, reshape the upsampled frequencies to recover for example an energy for each upsampled band.

The full band-synthesizer 134 may use the full band signal of the second combiner 128 and the excitation from the TCX processor 130 to form a decoded downmix signal 142. The first joint multichannel decoder 108 may comprise a time-frequency converter 144 for converting the output of the linear prediction domain decoder, for example the decoded downmix signal 142, into a spectral representation 145. Furthermore, an upmixer, e.g. implemented in a stereo decoder 146, may be controlled by the first multichannel information 20 to upmix the spectral representation into a multichannel signal. Moreover, a frequency-time-converter 148 may convert the upmix result into a time-representation 114. The time-frequency and/or the frequency-time-converter may comprise a complex operation or an oversampled operation, such as, for example a DFT or an IDFT.

Moreover, the first joint multichannel decoder, or more specifically, the stereo decoder 146 may use the multichannel residual signal 58, for example provided by the multichannel encoded audios signal 103, for generating the first multichannel representation. Moreover, the multichannel residual signal may comprise a lower bandwidth than the first multichannel representation, wherein the first joint multichannel decoder is configured to reconstruct an intermediate first multichannel representation using the first multichannel information and to add the multichannel residual signal to the intermediate first multichannel representation. In other words, the stereo decoder 146 may comprise a multichannel decoding using the first multichannel information 20, and optionally an improvement of the reconstructed multichannel signal by adding the multichannel residual signal to the reconstructed multichannel signal, after the spectral representation of the decoded downmix signal has been upmixed into a multichannel signal. Therefore, the first multichannel information and the residual signal may already operate on a multichannel signal.

The second joint multichannel decoder 110 may use, as an input, a spectral representation obtained by the frequency domain decoder. The spectral representation comprises, at least for a plurality of bands, a first channel signal 150*a* and a second channel signal 150*b*. Furthermore, the second joint multichannel processor 110 may apply to the plurality of bands of the first channel signal 150*a* and the second channel signal 150*b*. A joint multichannel operation such as, for example a mask indicating, for individual bands, a left/right or mid/side joint multichannel coding, and wherein the joint multichannel operation is a mid/side or left/right converting operation for converting bands indicated by the mask from a mid/side representation to a left/right representation, which is a conversion of the result of the joint multichannel operation into a time representation to obtain the second multichannel representation. Moreover, the frequency domain decoder may comprise a frequency-time converter 152 which is for example an IMDCT operation or a particularly sampled operation. In other words, the mask may comprise flags indicating e.g. L/R or M/S stereo coding, wherein the second joint multichannel encoder applies the corresponding stereo coding algorithm to the respective audio frames. Optionally, intelligent gap filling may be applied to the encoded audio signals to further reduce the bandwidth of the encoded audio signal. Therefore, e.g tonal frequency bands may be encoded at a high resolution using the afore mentioned stereo coding algorithms wherein other frequency bands may be parametrically encoded using e.g. an IGF algorithm.

In other words, in the LPD path 104, the transmitted mono signal is reconstructed by the switchable ACELP/TCX 120/130 decoder supported e.g. by TD-BWE 126 or IGF modules 132. Any ACELP initialization due to switching is performed on downsampled TCX/IGF output. The output of the ACELP is upsampled, using e.g. upsampler 124, to full sampling rate. All signals are mixed, using e.g. mixer 128, in time domain at high sampling rate and are further processed by the LPD stereo decoder 146 to provide LPD stereo.

LPD "Stereo decoding" consists of an upmix of the transmitted downmix steered by the application of the transmitted stereo parameters 20. Optionally, also a downmix residual 58 is contained in the bitstream. In this case, the residual is decoded and is included in the upmix calculation by the "Stereo Decoding" 146.

The FD path 106 is configured to have its own independent internal joint stereo or multi-channel decoding. For joint stereo decoding it reuses its own critically-sampled and real-valued filterbank 152, e.g. namely the IMDCT.

LPD stereo output and FD stereo output are mixed in time domain, using e.g. the first combiner 112 to provide the final output 118 of the fully switched coder.

Even though multichannel is described with respect to a stereo decoding in the related figures, the same principle may be also applied to multichannel processing with two or more channels in general.

Figure 8:
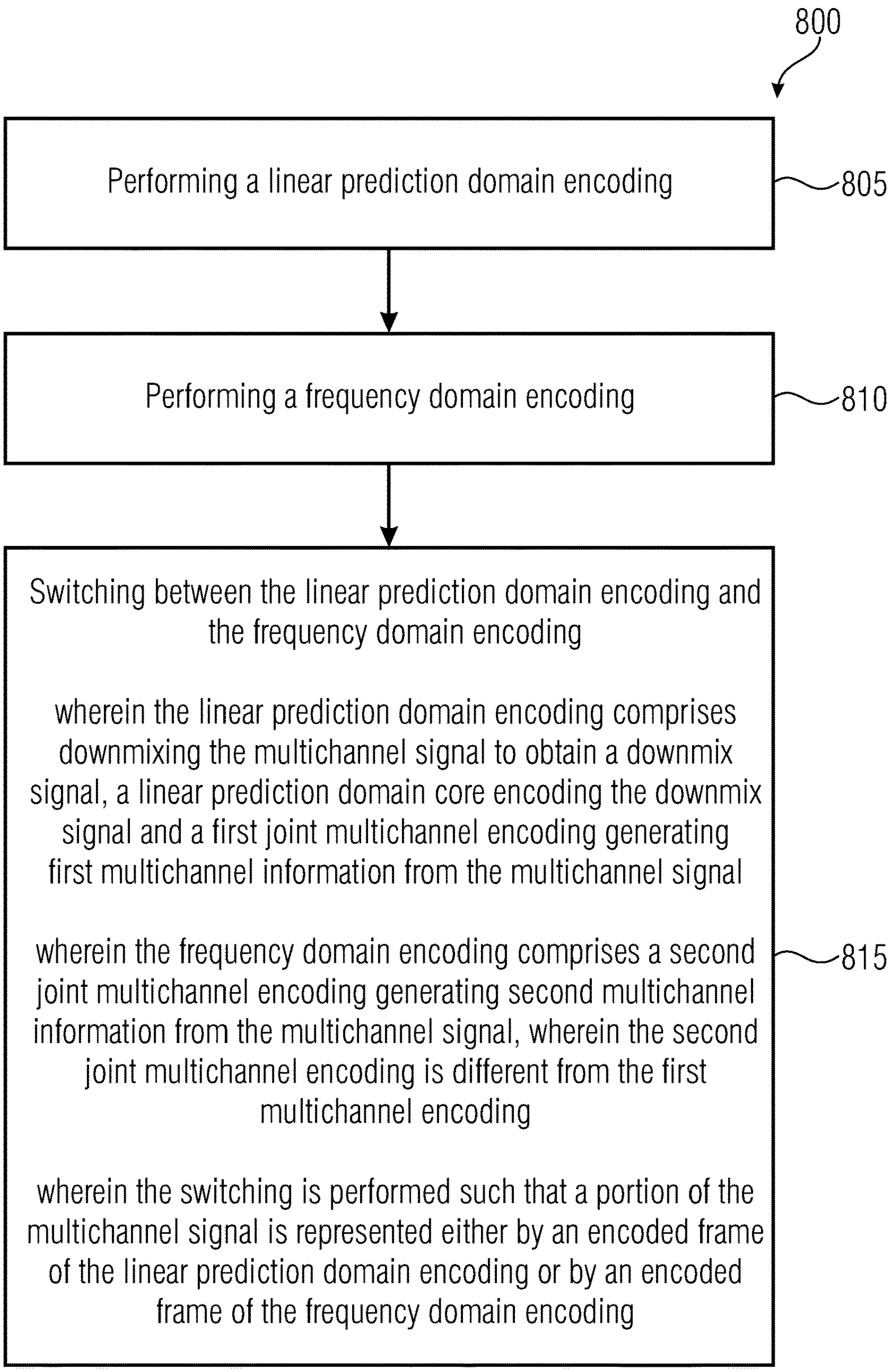
FIG. 8 shows a schematic block diagram of a method of encoding a multichannel signal.

FIG. 8 shows a schematic block diagram of a method 800 for encoding a multichannel signal. The method 800 comprises a step 805 of performing a linear prediction domain encoding, a step 810 of performing a frequency domain encoding, a step 815 of switching between the linear prediction domain encoding and the frequency domain encoding, wherein the linear prediction domain encoding comprises downmixing the multichannel signal to obtain a downmix signal, a linear prediction domain core encoding the downmix signal and a first joint multichannel encoding generating first multichannel information from the multichannel signal, wherein the frequency domain encoding comprises a second joint multichannel encoding generating a second multichannel information from the multichannel signal, wherein the second joint multichannel encoding is different from the first multichannel encoding, and wherein the switching is performed such that a portion of the multichannel signal is represented either by an encoded frame of the linear prediction domain encoding or by an encoded frame of the frequency domain encoding.

Figure 9:
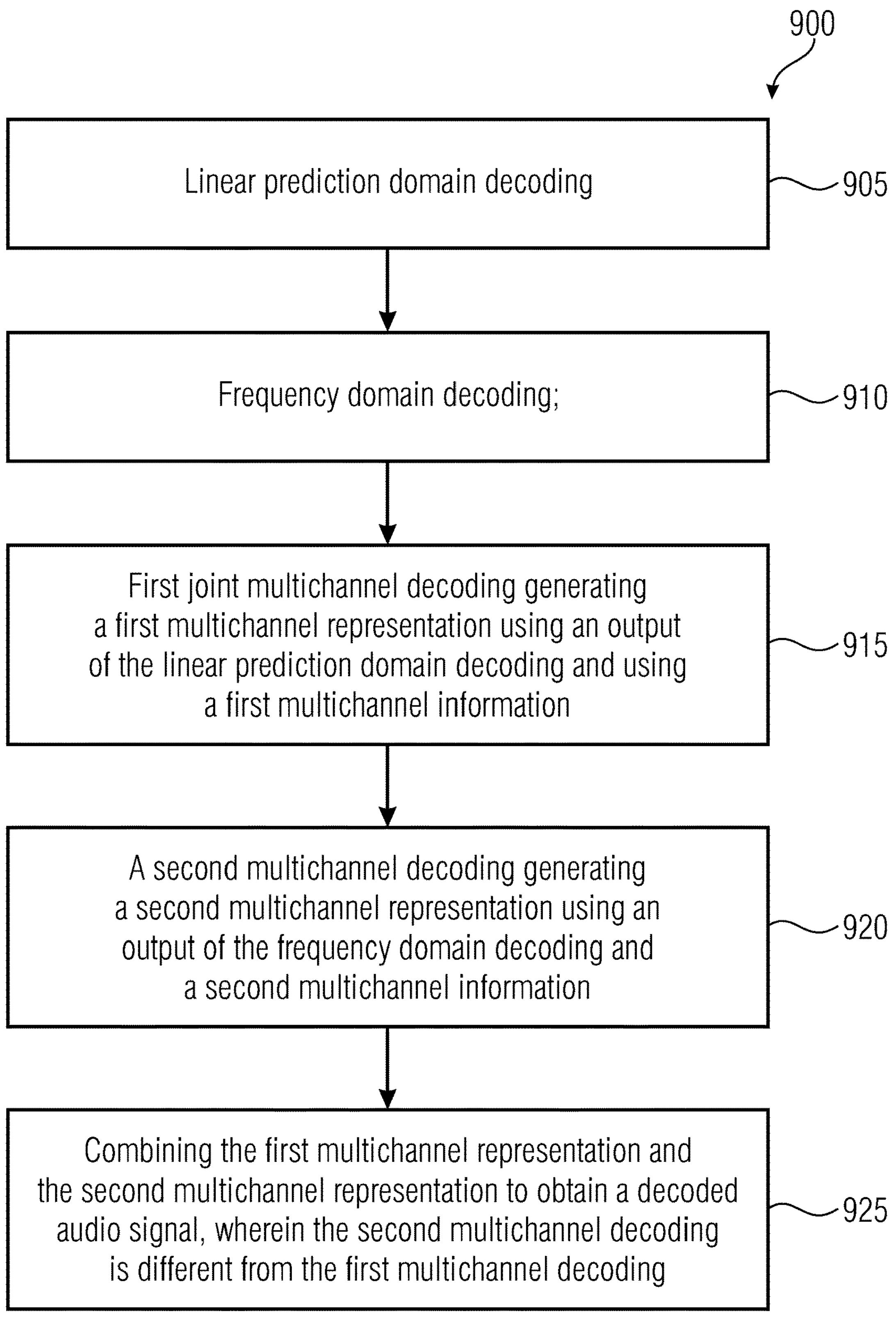
FIG. 9 shows a schematic block diagram of a method of decoding an encoded audio signal.

FIG. 9 shows a schematic block diagram of a method 900 of decoding an encoded audio signal. The method 900 comprises a step 905 of a linear prediction domain decoding, a step 910 of a frequency domain decoding, a step 915 of first joint multichannel decoding generating a first multichannel representation using an output of the linear prediction domain decoding and using a first multichannel information, a step 920 of a second multichannel decoding generating a second multichannel representation using an output of the frequency domain decoding and a second multichannel information, and a step 925 of combining the first multichannel representation and the second multichannel representation to obtain a decoded audio signal, wherein the second first multichannel information decoding is different from the first multichannel decoding.

Figure 10:
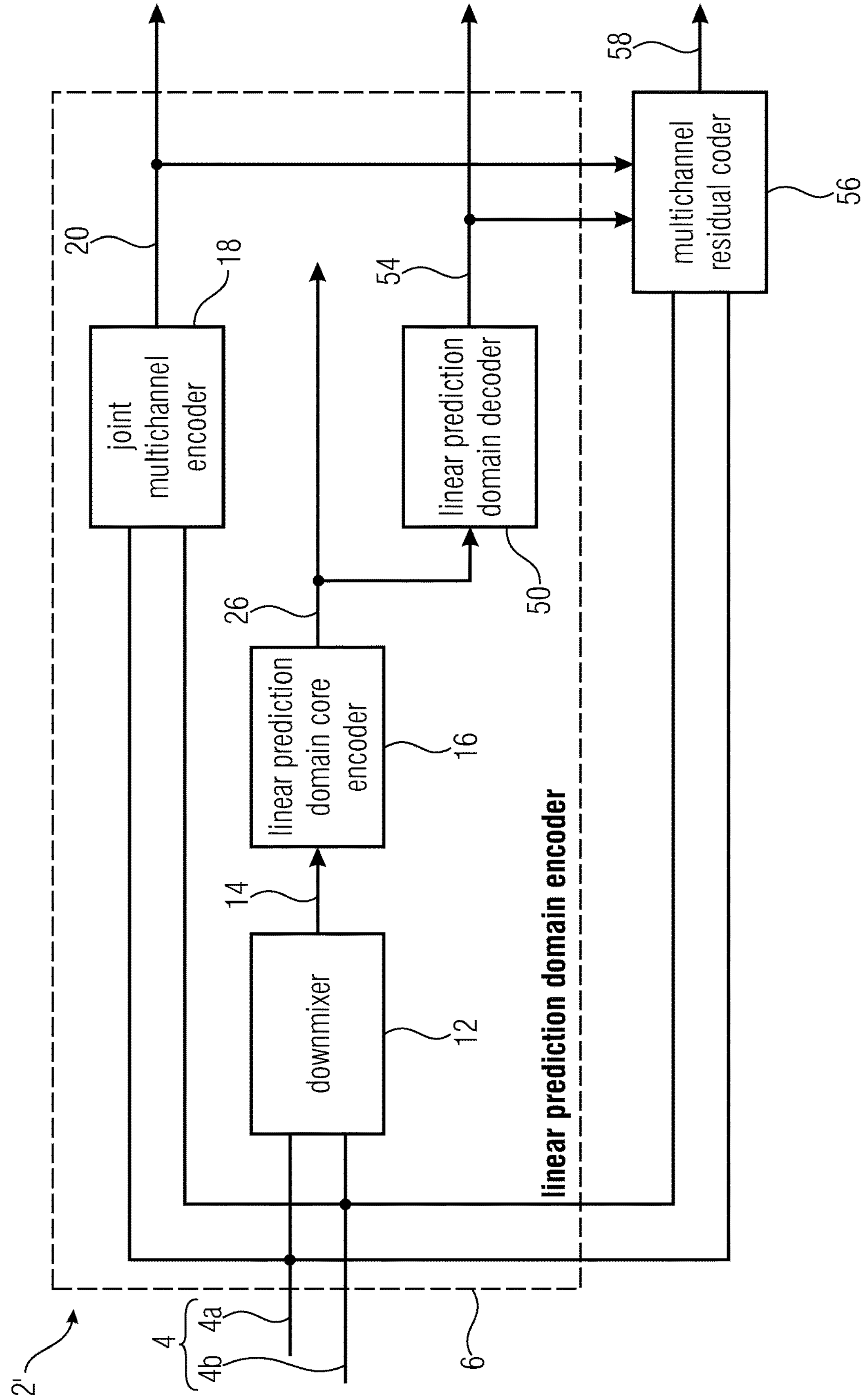
FIG. 10 shows a schematic block diagram of an encoder for encoding a multichannel signal according to a further aspect.

FIG. 10 shows a schematic block diagram of an audio encoder for encoding a multichannel signal according to a further aspect. The audio encoder 2' comprises a linear prediction domain encoder 6 and a multichannel residual coder 56. The linear prediction domain encoder comprises a downmixer 12 for downmixing the multichannel signal 4 to obtain a downmix signal 14, a linear prediction domain core encoder 16 for encoding the downmix signal 14. The linear prediction domain encoder 6 further comprises a joint multichannel encoder 18 for generating multichannel information 20 from the multichannel signal 4. Moreover, the linear prediction domain encoder comprises a linear prediction domain decoder 50 for decoding the encoded downmix signal 26 to obtain an encoded and decoded downmix signal 54. The multichannel residual coder 56 may calculate and encode the multichannel residual signal using the encoded and decoded downmix signal 54. The multichannel residual signal may represent an error between a decoded multichannel representation 54 using the multichannel information 20 and the multichannel signal 4 before downmixing.

According to an embodiment, the downmix signal 14 comprises a low band and a high band, wherein the linear prediction domain encoder may use a bandwidth extension processor to apply a bandwidth extension processing for parametrically encoding the high band, wherein the linear prediction domain decoder is configured to obtain, as the encoded and decoded downmix signal 54, only a low band signal representing the low band of the downmix signal, and wherein the encoded multichannel residual signal has only a band corresponding to the low band of the multichannel signal before downmixing. Moreover, the same description regarding audio encoder 2 may be applied to the audio encoder 2'. However, the further frequency encoding of encoder 2 is omitted. This simplifies the encoder configuration and is therefore advantageous, if the encoder is merely used for audio signals which merely comprise signals, which may be parametrically encoded in time domain without noticeable quality loss or where the quality of the decoded audio signal is still within specification. However, a dedicated residual stereo coding is advantageous to increase the reproduction quality of the decoded audio signal. More specifically, the difference between the audio signal before encoding and the encoded and decoded audio signal is derived and transmitted to the decoder to increase the reproduction quality of the decoded audio signal, since the difference of the decoded audio signal to the encoded audio signal is known by the decoder.

Figure 11:
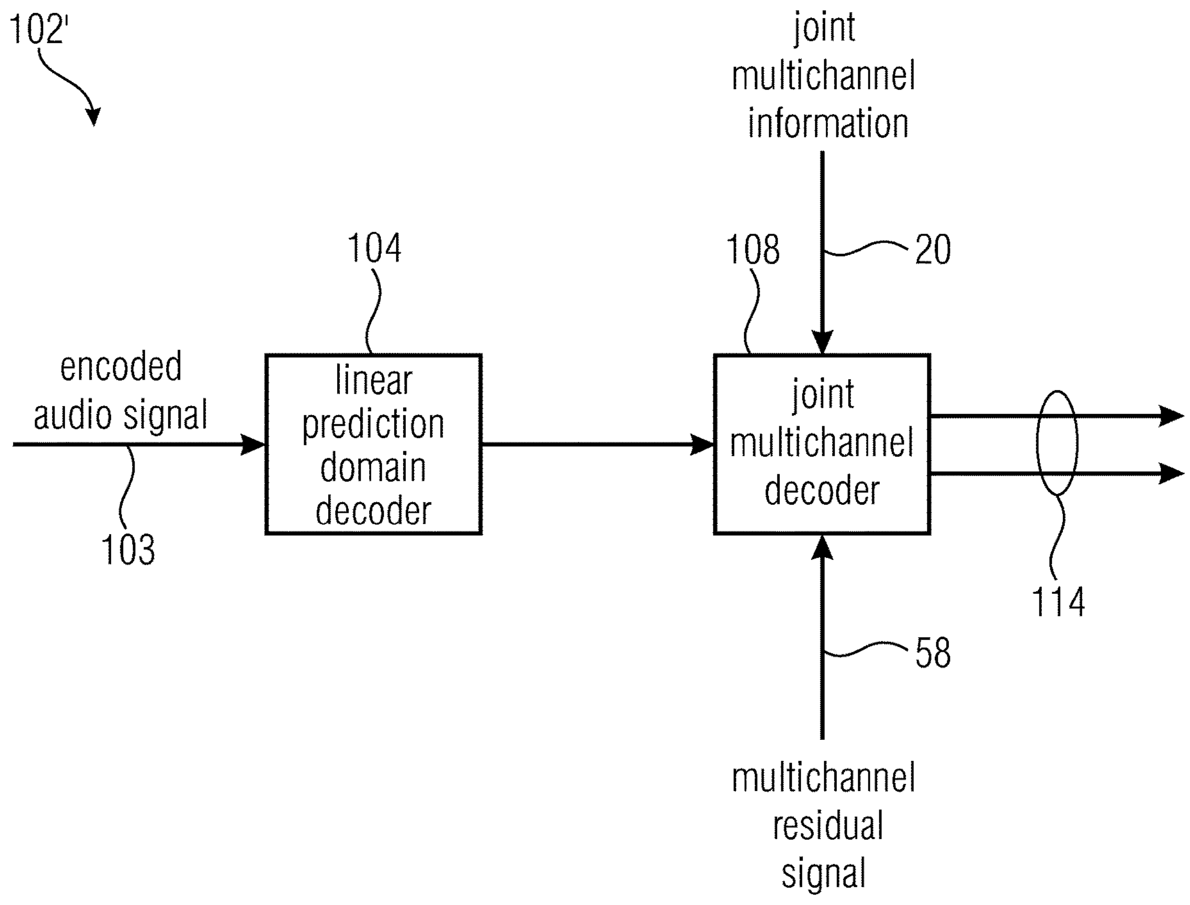
FIG. 11 shows a schematic block diagram of a decoder for decoding an encoded audio signal according to a further aspect.

FIG. 11 shows an audio decoder 102' for decoding an encoded audio signal 103 according to a further aspect. The audio decoder 102' comprises a linear prediction domain decoder 104, and a joint multichannel decoder 108 for generating a multichannel representation 114 using an output of the linear prediction domain decoder 104 and a joint multichannel information 20. Furthermore, the encoded audio signal 103 may comprise a multichannel residual signal 58, which may be used by the multichannel decoder for generating the multichannel representation 114. Moreover, the same explanations related to the audio decoder 102 may be applied to the audio decoder 102'. Herein, the residual signal from the original audio signal to the decoded audio signal is used and applied to the decoded audio signal to at least nearly achieve the same quality of the decoded audio signal compared to the original audio signal, even though parametric and therefore lossy coding is used. However, the frequency decoding part shown with respect to audio decoder 102 is omitted in audio decoder 102'.

Figure 12:
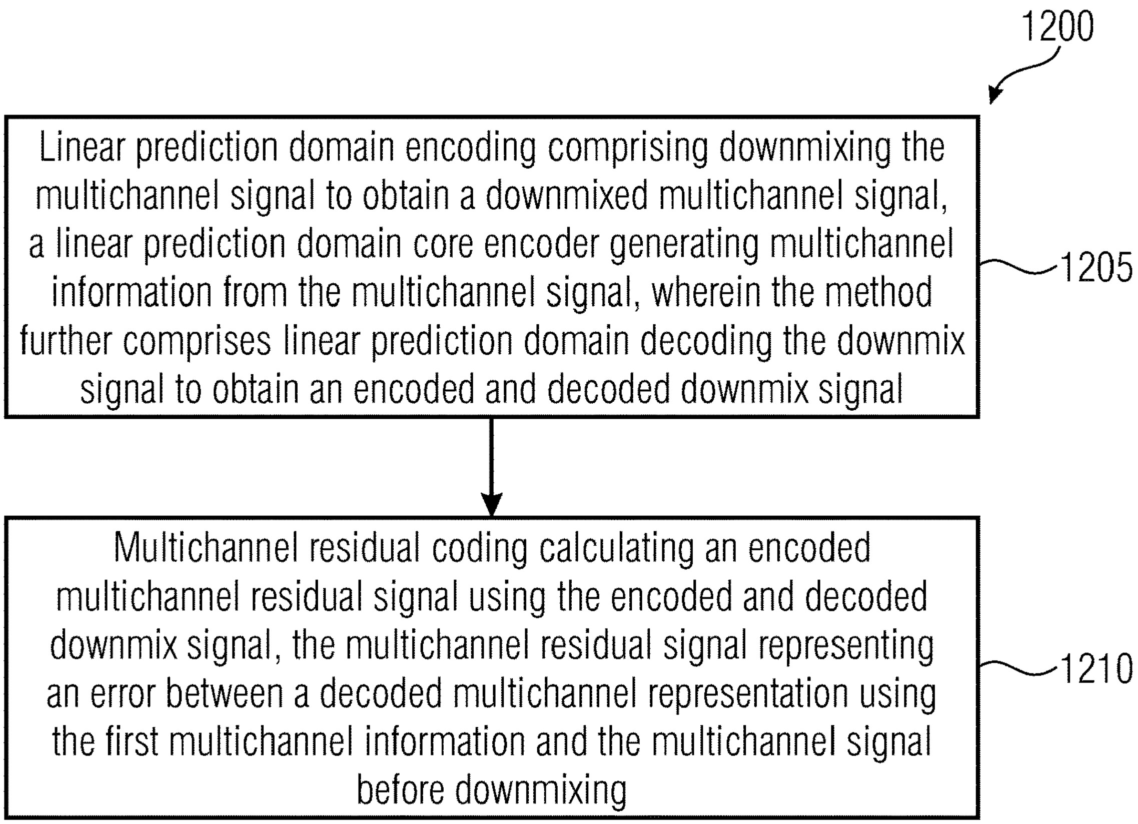
FIG. 12 shows a schematic block diagram of a method of audio encoding for encoding a multichannel signal according to a further aspect.

FIG. 12 shows a schematic block diagram of a method of audio encoding 1200 for encoding a multichannel signal. The method 1200 comprises a step 1205 of linear prediction domain encoding comprising downmixing the multichannel signal to obtain a downmixed multichannel signal, and a linear prediction domain core encoder generated multichannel information from the multichannel signal, wherein the method further comprises linear prediction domain decoding the downmix signal to obtain an encoded and decoded downmix signal, and a step 1210 of multichannel residual coding calculating an encoded multichannel residual signal using the encoded and decoded downmix signal, the multichannel residual signal representing an error between a decoded multichannel representation using the first multichannel information and the multichannel signal before downmixing.

Figure 13:
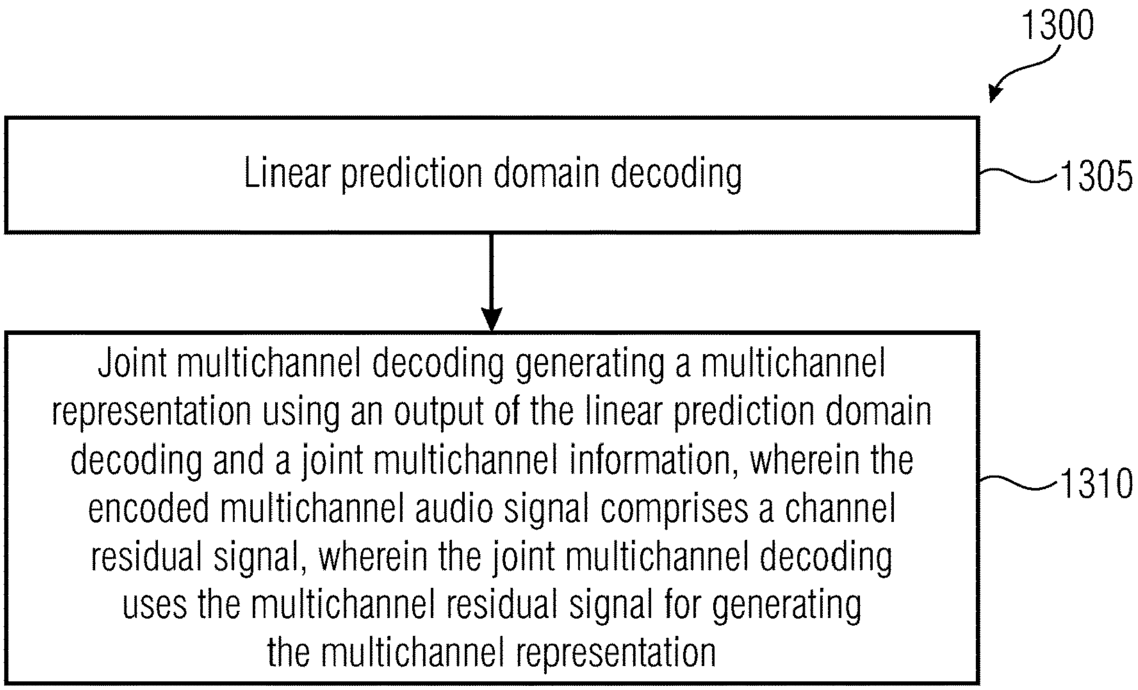
FIG. 13 shows a schematic block diagram of a method of decoding an encoded audio signal according to a further aspect.

FIG. 13 shows a schematic block diagram of a method 1300 of decoding an encoded audio signal. The method 1300 comprises a step 1305 of a linear prediction domain decoding and a step 1310 of a joint multichannel decoding generating a multichannel representation using an output of the linear prediction domain decoding and a joint multichannel information, wherein the encoded multichannel audio signal comprises a channel residual signal, wherein the joint multichannel decoding uses the multichannel residual signal for generating the multichannel representation.

The described embodiments may find use in the distribution of broadcasting of all types of stereo or multichannel audio content (speech and music alike with constant perceptual quality at a given low bitrate) such as, for example with digital radio, internet streaming and audio communication applications.

Figure 14:
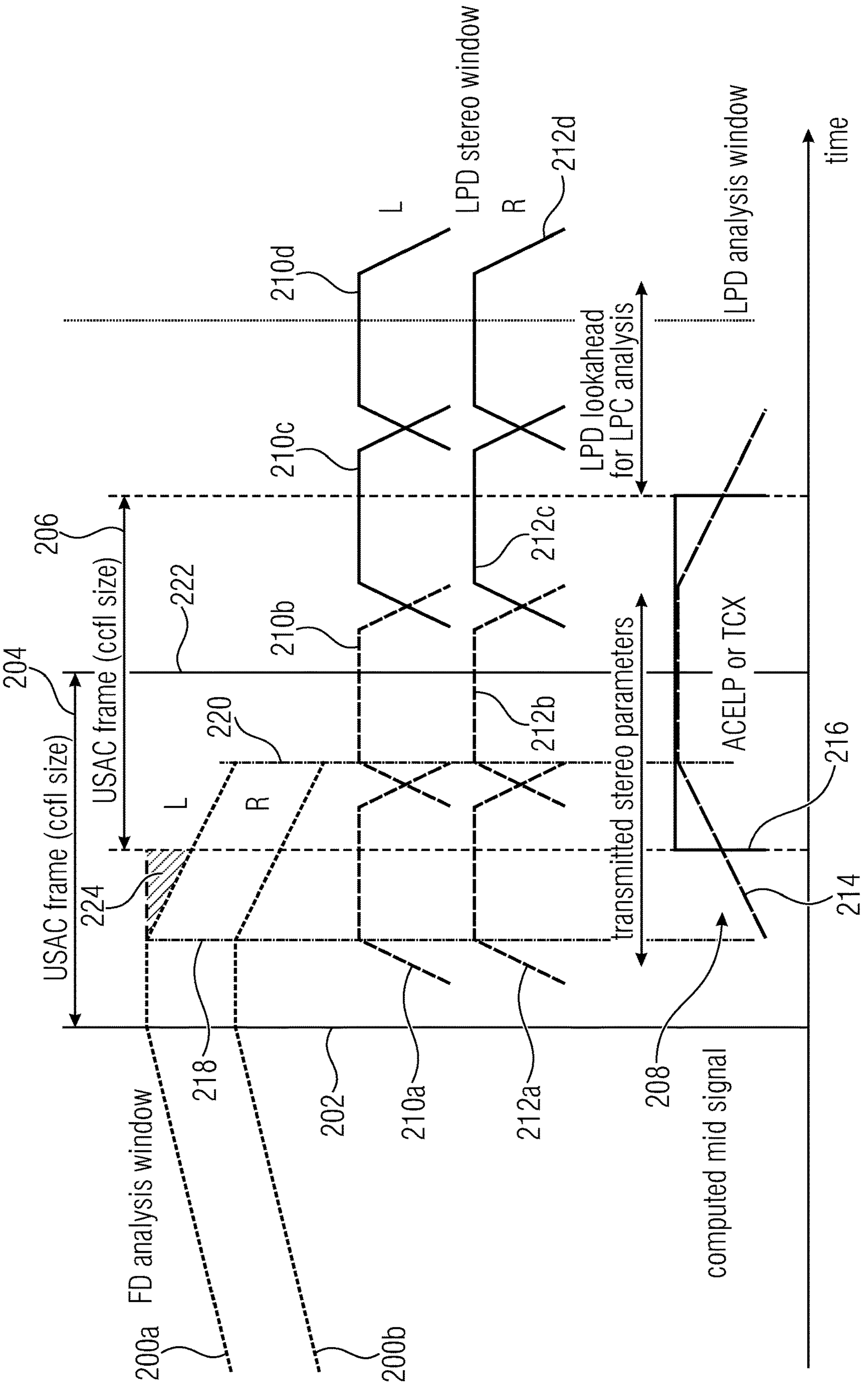
FIG. 14 shows a schematic timing diagram of a seamless switching from frequency domain encoding to LPD encoding.

FIGS. 14 to 17 describe embodiments of how to apply the proposed seamless switching between LPD coding and frequency domain coding and vice versa. In general, past windowing or processing is indicated using thin lines, bold lines indicate current windowing or processing where the switching is applied and dashed lines indicate a current processing that is done exclusively for the transition or switching. A switching or a transition from LPD coding to frequency coding FIG. 14 shows a schematic timing diagram indicating an embodiment for seamless switching between frequency domain encoding to time domain encoding. This may be relevant, if e.g. the controller 10 indicates that a current frame is better encoded using LPD encoding instead of FD encoding used for the previous frame. During frequency domain encoding a stop window 200*a* and 200*b* may be applied for each stereo signal (which may optionally be extended to more than two channels). The stop window differs from the standard MDCT overlap-and-add fading at the beginning 202 of the first frame 204. The left part of the stop window may be the classical overlap-and-add for encoding the previous frame using e.g. a MDCT time-frequency transform. Therefore, the frame before switching is still properly encoded. For the current frame 204, where switching is applied, additional stereo parameters are calculated, even though a first parametric representation of the mid signal for time domain encoding is calculated for the following frame 206. These two additional stereo analyses are done for being able to generate the Mid-signal 208 for the LPD lookahead. Though, the stereo parameters are transmitted (additionally) for the two first LPD stereo windows. In normal case, the stereo parameters are sent with two LPD stereo frames of delay. For updating ACELP memories such as for the LPC analysis or forward aliasing cancellation (FAC), the Mid signal is also made available for the past. Hence, the LPD stereo windows 210*a-d* for a first stereo signal and 212*a-d* for a second stereo signal may applied in the analysis filterbank 82, before e.g. applying a time-frequency conversion using a DFT. The Mid signal may comprise a typical crossfade ramp when using TCX encoding, resulting in the exemplary LPD analysis window 214. If ACELP is used for encoding the audio signal such as the mono low-band signal, it is simply chosen a number of frequency bands whereon the LPC analysis is applied, indicated by the rectangular LPD analysis window 216.

Moreover, the timing indicated by vertical line 218 shows, that the current frame where the transition is applied, comprises information from the frequency domain analysis windows 200*a*, 200*b* and the computed mid signal 208 and the corresponding stereo information. During the horizontal part of the frequency analysis window between lines 202 and 218, the frame 204 is perfectly encoded using the frequency domain encoding. From line 218 to the end of the frequency analysis window at line 220, the frame 204 comprises information from both, the frequency domain encoding and the LPD encoding and from line 220 to the end of the frame 204 at vertical line 222, only the LPD encoding contributes to the encoding of the frame. Further attention is drawn on the middle part of the encoding, since the first and the last (third) part is simply derived from one encoding technique without having aliasing. For the middle part, however, it should be differentiated between ACELP and TCX mono signal encoding. Since TCX encoding uses a cross fading as already applied with the frequency domain encoding, a simple fade out of the frequency encoded signal and a fade in of the TCX encoded mid signal provides complete information for encoding the current frame 204. If ACELP is used for mono signal encoding, a more sophisticated processing may be applied, since the area 224 may not comprise the complete information for encoding the audio signal. A proposed method is the forward aliasing correction (FAC) e.g. described in the USAC specifications in section 7.16.

According to an embodiment, the controller 10 is configured to switch within a current frame 204 of a multichannel audio signal from using the frequency domain encoder 8 for encoding a previous frame to the linear prediction domain encoder for decoding an upcoming frame. The first joint multichannel encoder 18 may calculate synthetic multichannel parameters 210*a*, 210*b*, 212*a*, 212*b* from the multichannel audio signal for the current frame, wherein the second joint multichannel encoder 22 is configured to weight the second multichannel signal using a stop window.

Figure 15:
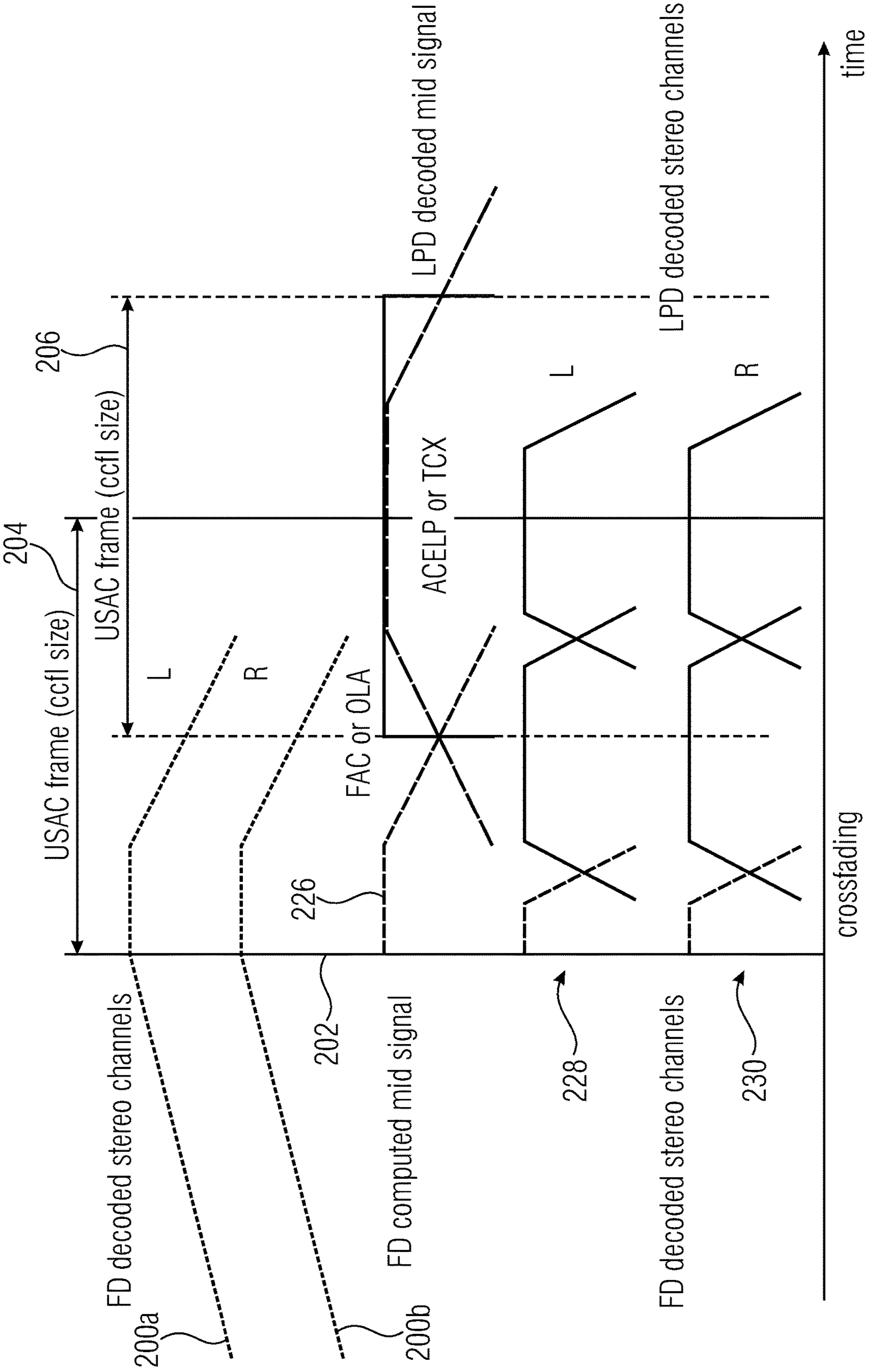
FIG. 15 shows a schematic timing diagram of a seamless switching from frequency domain decoding to LPD domain decoding.

FIG. 15 shows a schematic timing diagram of a decoder corresponding to the encoder operations of FIG. 14. Herein, the reconstruction of the current frame 204 is described according to an embodiment. As already seen in the encoder timing diagram of FIG. 14, the frequency domain stereo channels are provided from the previous frame having applied stop windows 200*a* and 200*b*. The transitions from FD to LPD mode are done first on the decoded Mid signal as in mono case. It is achieved by artificially create a mid-signal 226 from the time domain signal 116 decoded in FD mode, where ccfl is the core code frame length and L_fac denotes a length of the frequency aliasing cancellation window or frame or block or transform.

$$x[n - ccfl/2] = 0.5 \cdot l_{i-1}[n] + 0.5 \cdot r_{i-1}[n],$$
$$\text{for } ccfl \le n < \frac{ccfl}{2} + \text{L\_fac}$$

This signal is then conveyed to the LPD decoder 120 for updating the memories and applying the FAC decoding as it is done in the mono case for transitions from FD mode to ACELP. The processing is described in USAC specifications [ISO/IEC DIS 23003-3, Usac] in section 7.16. In case of FD mode to TCX, a conventional overlap-add is performed. The LPD stereo decoder 146 receives as input signal a decoded (in frequency domain after time-frequency conversion of time-frequency converter 144 is applied) Mid signal e.g. by applying the transmitted stereo parameters 210 and 212 for stereo processing, where the transition is already done. The stereo decoder outputs then a left and right channel signal 228, 230 which overlap the previous frame decoded in FD mode. The signals, namely the FD decoded time domain signal and the LPD decoded time domain signal for the frame where the transition is applied, are then cross-faded (in the combiner 112) on each channel for smoothing the transition in the left and right channels:

$$l\left[n - \frac{ccfl}{2} + \text{L\_fac}\right] = \begin{cases} l_{i-1}[ccfl + n], & \text{for } 0 \le n < \frac{ccfl}{2} - \text{L\_fac} - L \\ l_{i-1}\left[ccfl + \frac{ccfl}{2} - \text{L\_fac} - L + n\right] \cdot w[L-1-n] + l_i[n] \cdot w[n], & \text{for } 0 \le n < L \\ l_i[n], & \text{for } L \le n < M \end{cases}$$

$$r\left[n - \frac{ccfl}{2} + \text{L\_fac}\right] = \begin{cases} r_{i-1}[ccfl + n], & \text{for } 0 \le n < \frac{ccfl}{2} - \text{L\_fac} - L \\ r_{i-1}\left[ccfl + \frac{ccfl}{2} - \text{L\_fac} - L + n\right] \cdot w[L-1-n] + r_i[n] \cdot w[n], & \text{for } 0 \le n < L \\ r_i[n], & \text{for } L \le n < M \end{cases}$$

In FIG. 15, the transition is illustrated schematically using M=ccfl/2. Moreover, the combiner may perform a cross-fading at consecutive frames being decoded using only FD or LPD decoding without a transition between these modes.

In other words, the overlap-and-add process of the FD decoding, especially when using an MDCT/IMDCT for time-frequency/frequency-time conversion, is replaced by a cross-fading of the FD decoded audio signal and the LPD decoded audio signal. Therefore, the decoder should calculate a LPD signal for the fade-out part of the FD decoded audio signal to fade-in the LPD decoded audio signal. According to an embodiment, the audio decoder 102 is configured to switch within a current frame 204 of a multichannel audio signal from using the frequency domain decoder 106 for decoding a previous frame to the linear prediction domain decoder 104 for decoding an upcoming frame. The combiner 112 may calculate a synthetic mid-signal 226 from the second multichannel representation 116 of the current frame. The first joint multichannel decoder 108 may generate the first multichannel representation 114 using the synthetic mid-signal 226 and a first multichannel information 20. Furthermore, the combiner 112 is configured to combine the first multichannel representation and the second multichannel representation to obtain a decoded current frame of the multichannel audio signal.

Figure 16:
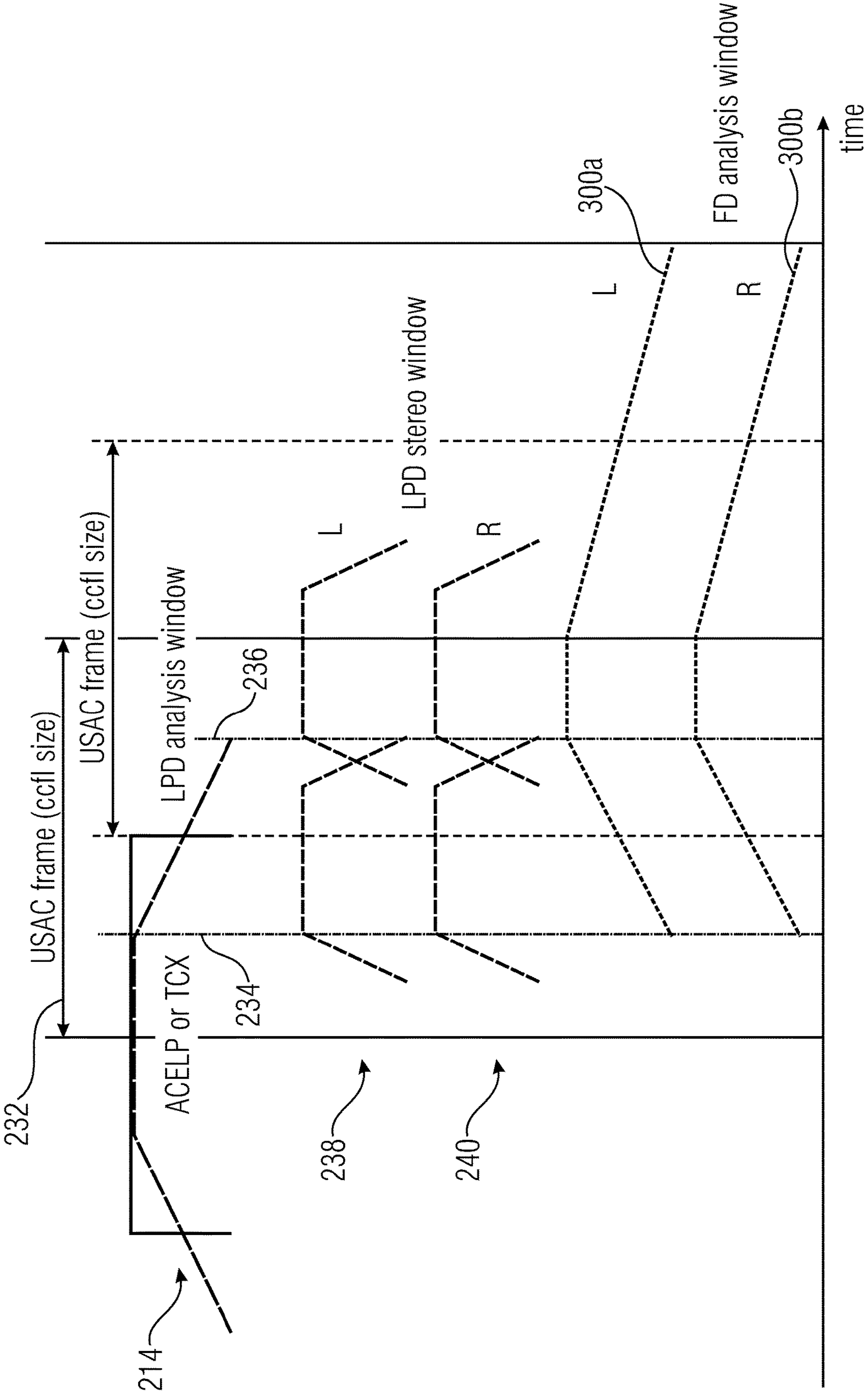
FIG. 16 shows a schematic timing diagram of a seamless switching from LPD encoding to frequency domain encoding.

FIG. 16 shows a schematic timing diagram in the encoder for performing a transition of using LPD encoding to using FD decoding in a current frame 232. For switching from LPD to FD encoding, a start window 300*a*, 300*b* may be applied on the FD multichannel encoding. The start window has a similar functionality when compared to the stop window 200*a*, 200*b*. During fade-out of the TCX encoded mono signal of the LPD encoder between vertical lines 234 and 236, the start window 300*a*, 300*b* performs a fade-in. When using ACELP instead of TCX, the mono signal does not perform a smooth fade-out. Nonetheless, the correct audio signal may be reconstructed in the decoder using e.g. FAC. The LPD stereo windows 238 and 240 are calculated by default and refer to the ACELP or TCX encoded mono signal, indicated by the LPD analysis windows 241.

Figure 17:
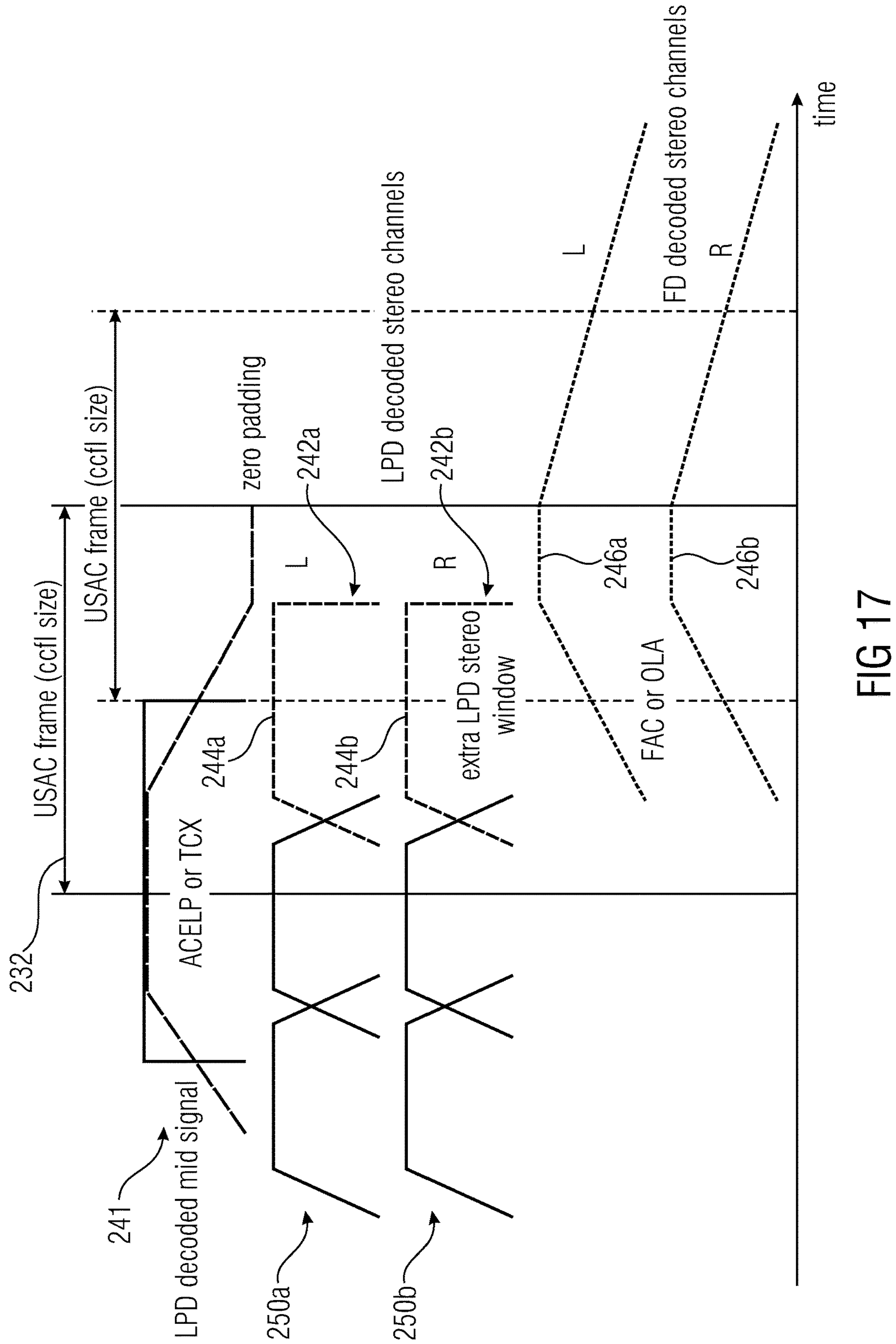
FIG. 17 shows a schematic timing diagram of a seamless switching from LPD decoding to frequency domain decoding.

FIG. 17 shows a schematic timing diagram in the decoder corresponding to the timing diagram of the encoder described with respect to FIG. 16.

For transition from LPD mode to FD mode, an extra frame is decoded by stereo decoder 146. The mid signal coming from the LPD mode decoder is extended with zero for the frame index i=ccfl/M.

$$x[i \cdot M + n - L] = \begin{cases} x[i \cdot M + n - L], & \text{for } 0 \le n < L + 2 \cdot \text{L\_fac} \\ 0, & \text{for } L + 2 \cdot \text{L\_fac} \le n < M \end{cases}$$

The stereo decoding as described previously may be performed by holding the last stereo parameters, and by switching off the Side signal inverse quantization, i.e. code_mode is set to 0. Moreover the right side windowing after the inverse DFT is not applied, which results in a sharp edge 242*a*, 242*b* of the extra LPD stereo window 244*a*, 244*b*. It may be clearly seen, that the shape edge is located at the plane section 246*a*, 246*b*, where the entire information of the corresponding part of the frame may be derived from the FD encoded audio signal. Therefore, a right side windowing (without the sharp edge) might result in an unwanted interfering of the LPD information to the FD information and is therefore not applied.

The resulting left and right (LPD decoded) channels 250*a*, 250*b* (using the LPD decoded Mid signal indicated by LPD analysis windows 248 and the stereo parameters) are then combined to the FD mode decoded channels of the next frame by using an overlap-add processing in case of TCX to FD mode or by using a FAC for each channel in case of ACELP to FD mode. A schematic illustration of the transitions is depicted in FIG. 17 where M=ccfl/2.

According to embodiments, the audio decoder 102 may switch within a current frame 232 of a multichannel audio signal from using the linear prediction domain decoder 104 for decoding a previous frame to the frequency domain decoder 106 for decoding an upcoming frame. The stereo decoder 146 may calculate a synthetic multichannel audio signal from a decoded mono signal of the linear prediction domain decoder for a current frame using multichannel information of a previous frame, wherein the second joint multichannel decoder 110 may calculate the second multichannel representation for the current frame and to weight the second multichannel representation using a start window. The combiner 112 may combine the synthetic multichannel audio signal and the weighted second multichannel representation to obtain a decoded current frame of the multichannel audio signal.

Figure 18:
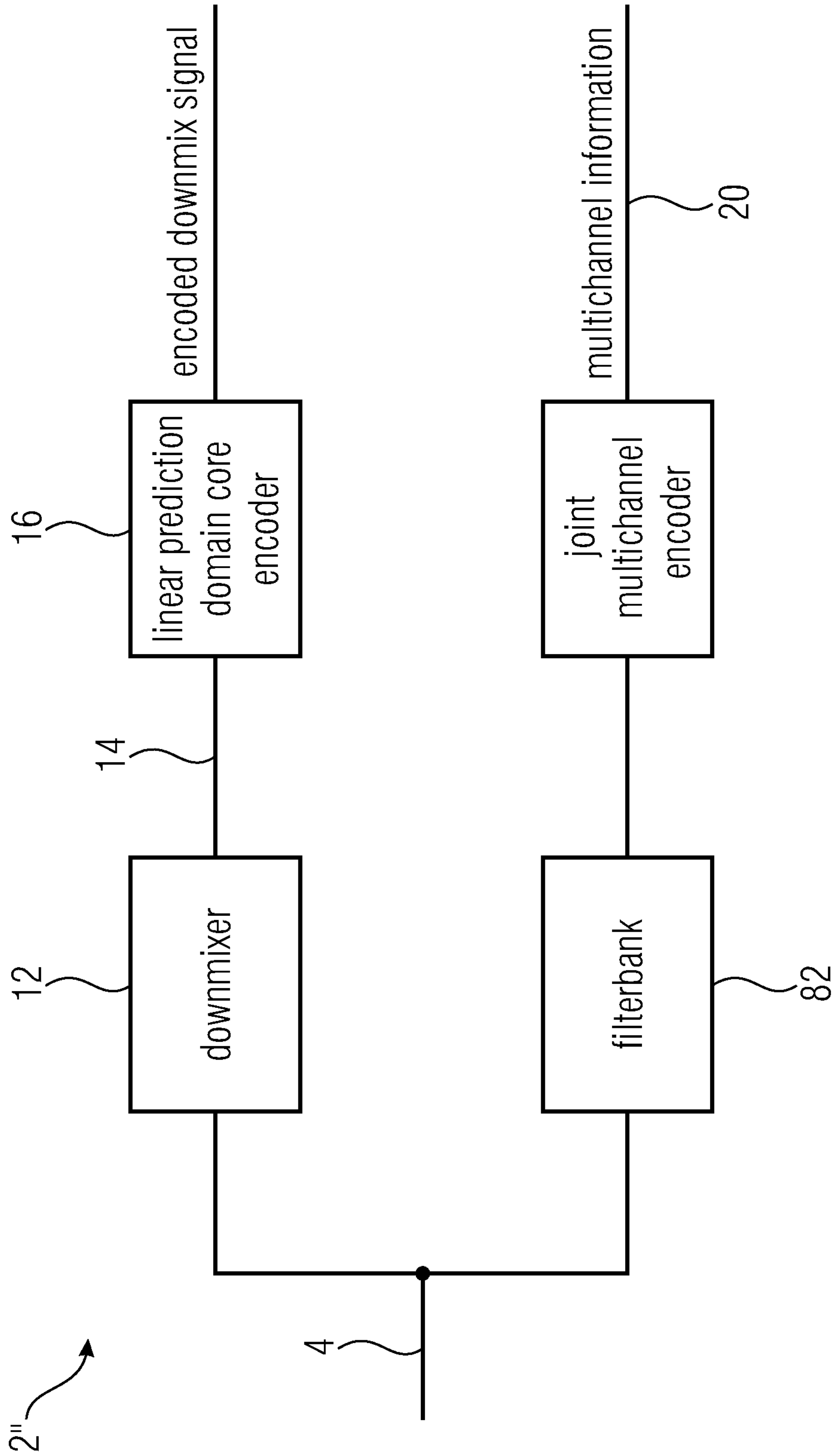
FIG. 18 shows a schematic block diagram of an encoder for encoding a multichannel signal according to a further aspect.

FIG. 18 shows a schematic block diagram of an encoder 2" for encoding a multichannel signal 4. The audio encoder 2" comprises a downmixer 12, a linear prediction domain core encoder 16, a filterbank 82, and a joint multichannel encoder 18. The downmixer 12 is configured for downmixing the multichannel signal 4 to obtain a downmix signal 14. The downmix signal may be a mono signal such as e.g. a mid signal of an M/S multichannel audio signal. The linear prediction domain core encoder 16 may encode the downmix signal 14, wherein the downmix signal 14 has a low band and a high band, wherein the linear prediction domain core encoder 16 is configured to apply a bandwidth extension processing for parametrically encoding the high band. Furthermore, the filterbank 82 may generate a spectral representation of the multichannel signal 4 and the joint multichannel encoder 18 may be configured to process the spectral representation comprising the low band and the high band of the multichannel signal to generate multichannel information 20. The multichannel information may comprise ILD and/or IPD and/or IID (Interaural Intensity Difference) parameters, enabling a decoder to recalculate the multichannel audio signal from the mono signal. A more detailed drawing of further aspects of embodiments according to this aspect may be found in the previous FIGS., especially in FIG. 4.

According to embodiments, the linear prediction domain core encoder 16 may further comprise a linear prediction domain decoder for decoding the encoded downmix signal 26 to obtain an encoded and decoded downmix signal 54. Herein, the linear prediction domain core encoder may form a mid signal of an M/S audio signal which is encoded for transmission to a decoder. Furthermore the audio encoder further comprises a multichannel residual coder 56 for calculating an encoded multichannel residual signal 58 using the encoded and decoded downmix signal 54. The multichannel residual signal represents an error between a decoded multichannel representation using the multichannel information 20 and the multichannel signal 4 before downmixing. In other words the multichannel residual signal 58 may be a side signal of the M/S audio signal, corresponding to the mid signal calculated using the linear prediction domain core encoder.

According to further embodiments, the linear prediction domain core encoder 16 is configured to apply a bandwidth extension processing for parametrically encoding the high band and to obtain, as the encoded and decoded downmix signal, only a low band signal representing the low band of the downmix signal, and wherein the encoded multichannel residual signal 58 has only a band corresponding to the low band of the multichannel signal before downmixing. Additionally or alternatively, the multichannel residual coder may simulate the time domain bandwidth extension which is applied on the high band of the multichannel signal in the linear prediction domain core encoder and to calculate a residual or side signal for the high band to enable a more accurate decoding of the mono or mid signal to derive the decoded multichannel audio signal. The simulation may comprise the same or a similar calculation, which is performed in the decoder to decode the bandwidth extended high band. An alternative or additional approach to simulating the bandwidth extension may be a prediction of the side signal. Therefore, the multichannel residual coder may calculate a full band residual signal from a parametric representation 83 of the multichannel audio signal 4 after time-frequency conversion in filterbank 82. This full band side signal may be compared to a frequency representation of a full band mid signal similarly derived from the parametric representation 83. The full band mid signal may be e.g. calculated as a sum of the left and the right channel of the parametric representation 83 and the full band side signal as a difference thereof. Moreover, the prediction may therefore calculate a prediction factor of the full band mid signal minimizing an absolute difference of the full band side signal and the product of the prediction factor and the full band mid signal.

In other words, the linear prediction domain encoder may be configured to calculate the downmix signal 14 as a parametric representation of a mid signal of an M/S multichannel audio signal, wherein the multichannel residual coder may be configured to calculate a side signal corresponding to the mid signal of the M/S multichannel audio signal, wherein the residual coder may calculate a high band of the mid signal using simulating time domain bandwidth extension or wherein the residual coder may predict the high band of the mid signal using finding a prediction information that minimizes a difference between a calculated side signal and a calculated full band mid signal from the previous frame.

Further embodiments show the linear prediction domain core encoder 16 comprising an ACELP processor 30. The ACELP processor may operate on a downsampled downmix signal 34. Furthermore, a time domain bandwidth extension processor 36 is configured to parametrically encode a band of a portion of the downmix signal removed from the ACELP input signal by a third downsampling. Additionally or alternatively, the linear prediction domain core encoder 16 may comprise a TCX processor 32. The TCX processor 32 may operate on the downmix signal 14 not downsampled or downsampled by a degree smaller than the downsampling for the ACELP processor. Furthermore, the TCX processor may comprise a first time-frequency converter 40, a first parameter generator 42 for generating a parametric representation 46 of a first set of bands and a first quantizer encoder 44 for generating a set of quantized encoded spectral lines 48 for a second set of bands. The ACELP processor and the TCX processor may either perform separately, e.g. a first number of frames is encoded using ACELP and a second number of frames is encoded using TCX, or in a joint manner where both, ACELP and TCX contribute information to decode one frame.

Further embodiments show the time-frequency converter 40 being different from the filterbank 82. The filterbank 82 may comprise filter parameters optimized to generate a spectral representation 83 of the multichannel signal 4, wherein the time-frequency converter 40 may comprise filter parameters optimized to generate a parametric representation 46 of a first set of bands. In a further step, it has to be noted that the linear prediction domain encoder uses different or even no filter bank in case of bandwidth extension and/or ACELP. Furthermore, the filterbank 82 may calculate separate filter parameters to generate the spectral representation 83 without being dependent on a previous parameter choice of the linear prediction domain encoder. In other words, the multichannel coding in LPD mode may use a filterbank for the multichannel processing (DFT) which is not the one used in the bandwidth extension (time domain for ACELP and MDCT for TCX). An advantage thereof is that each parametric coding can use its optimal time-frequency decomposition for getting its parameters. E.g. a combination of ACELP+TDBWE and parametric multichannel coding with external filterbank (e.g. DFT) is advantageous. This combination is particularly efficient since it is known that the best bandwidth extension for speech should be in the time domain and the multichannel processing in the frequency domain. Since ACELP+TDBWE don't have any time-frequency converter, an external filterbank or transformation like DFT is advantageous or may be even mandatory. Other concepts use the same filterbank and therefore do not use different filter banks, such as e.g.:

IGF and joint stereo coding for AAC in MDCT

SBR+PS for HeAACv2 in QMF

SBR+MPS212 for USAC in QMF.

According to further embodiments, the multichannel encoder comprises a first frame generator and the linear prediction domain core encoder comprises a second frame generator, wherein the first and the second frame generator are configured to form a frame from the multichannel signal 4, wherein the first and the second frame generator are configured to form a frame of a similar length. In other words, the framing of the multichannel processor may be the same as the one used in ACELP. Even if the multichannel processing is done in the frequency domain, the time resolution for computing its parameters or downmixing should be ideally closed to or even equal to the framing of ACELP. A similar length in this case may refer to the framing of ACELP which may be equal or close to the time resolution for computing the parameters for multichannel processing or downmixing.

According to further embodiments, the audio encoder further comprises a linear prediction domain encoder 6 comprising the linear prediction domain core encoder 16 and the multichannel encoder 18, a frequency domain encoder 8, and a controller 10 for switching between the linear prediction domain encoder 6 and the frequency domain encoder 8. The frequency domain encoder 8 may comprise a second joint multichannel encoder 22 for encoding second multichannel information 24 from the multichannel signal, wherein the second joint multichannel encoder 22 is different from the first joint multichannel encoder 18. Furthermore, the controller 10 is configured such that a portion of the multichannel signal is represented either by an encoded frame of the linear prediction domain encoder or by an encoded frame of the frequency domain encoder.

Figure 19:
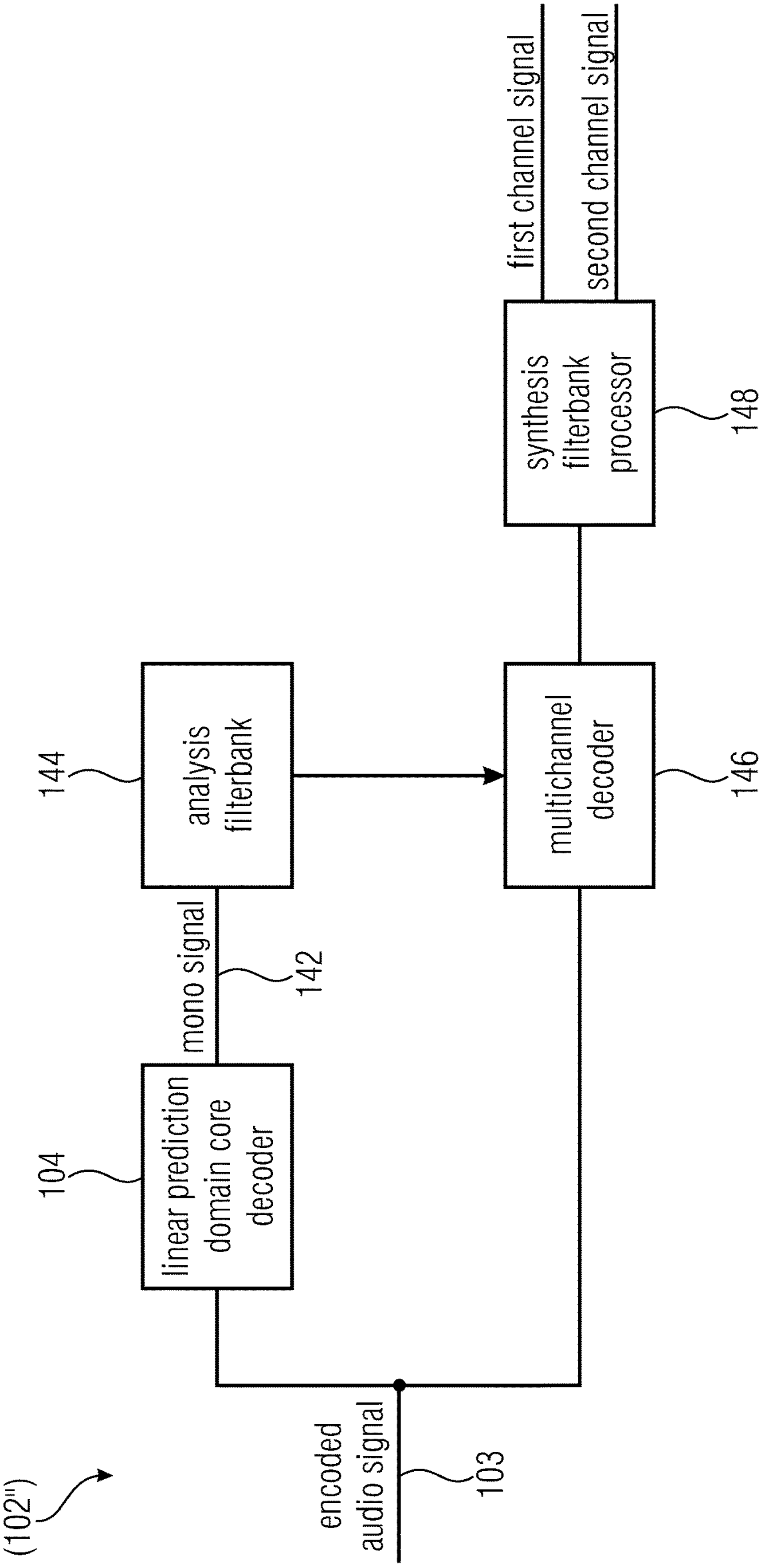
FIG. 19 shows a schematic block diagram of a decoder for decoding an encoded audio signal according to a further aspect.

FIG. 19 shows a schematic block diagram of a decoder 102" for decoding an encoded audio signal 103 comprising a core encoded signal, bandwidth extension parameters, and multichannel information according to a further aspect. The audio decoder comprises a linear prediction domain core decoder 104, an analysis filterbank 144, a multichannel decoder 146, and a synthesis filterbank processor 148. The linear prediction domain core decoder 104 may decode the core encoded signal to generate a mono signal. This may be a (full band) mid signal of an M/S encoded audio signal. The analysis filterbank 144 may convert the mono signal into a spectral representation 145 wherein the multichannel decoder 146 may generate a first channel spectrum and a second channel spectrum from the spectral representation of the mono signal and the multichannel information 20. Therefore, the multichannel decoder may use the multichannel information e.g. comprising a side signal corresponding to the decoded mid signal. A synthesis filterbank processor 148 configured for synthesis filtering the first channel spectrum to obtain a first channel signal and for synthesis filtering the second channel spectrum to obtain a second channel signal. Therefore, the inverse operation compared to the analysis filterbank 144 may be applied to the first and the second channel signal, which may be an IDFT if the analysis filterbank uses a DFT. However, the filterbank processor may e.g. process the two channel spectra in parallel or in a consecutive order using e.g. the same filterbank. Further detailed drawings regarding this further aspect can be seen in the previous figures, especially with respect to FIG. 7.

According to further embodiments, the linear prediction domain core decoder comprises a bandwidth extension processor 126 for generating a high band portion 140 from the bandwidth extension parameters and the lowband mono signal or the core encoded signal to obtain a decoded high band 140 of the audio signal, a low band signal processor configured to decode the low band mono signal, and a combiner 128 configured to calculate a full band mono signal using the decoded low band mono signal and the decoded high band of the audio signal. The low band mono signal may be e.g. a baseband representation of a mid signal of a M/S multichannel audio signal wherein the bandwidth extension parameters may be applied to calculate (in the combiner 128) a full band mono signal from the low band mono signal.

According to further embodiments, the linear prediction domain decoder comprises an ACELP decoder 120, a low band synthesizer 122, an upsampler 124, a time domain bandwidth extension processor 126 or a second combiner 128, wherein the second combiner 128 is configured for combining an upsampled low band signal and a bandwidth-extended high band signal 140 to obtain a full band ACELP decoded mono signal. The linear prediction domain decoder may further comprise a TCX decoder 130 and an intelligent gap filling processor 132 to obtain a full band TCX decoded mono signal. Therefore, a full band synthesis processor 134 may combine the full band ACELP decoded mono signal and the full band TCX decoded mono signal. Additionally, a cross-path 136 may be provided for initializing the low band synthesizer using information derived by a low band spectrum-time conversion from the TCX decoder and the IGF processor.

According to further embodiments, the audio decoder comprises a frequency domain decoder 106, a second joint multichannel decoder 110 for generating a second multichannel representation 116 using an output of the frequency domain decoder 106 and a second multichannel information 22, 24, and a first combiner 112 for combining the first channel signal and the second channel signal with the second multichannel representation 116 to obtain a decoded audio signal 118, wherein the second joint multichannel decoder is different from the first joint multichannel decoder. Therefore, the audio decoder may switch between a parametric multichannel decoding using LPD or a frequency domain decoding. This approach has been already described in detail with respect to the previous figures.

According to further embodiments, the analysis filterbank 144 comprises a DFT to convert the mono signal into a spectral representation 145 and wherein the full band synthesis processor 148 comprises an IDFT to convert the spectral representation 145 into the first and the second channel signal. Moreover, the analysis filterbank may apply a window on the DFT-converted spectral representation 145 such that a right portion of the spectral representation of a previous frame and a left portion of the spectral representation of a current frame are overlapping, wherein the previous frame and the current frame are consecutive. In other words, a cross-fade may be applied from one DFT block to another to perform a smooth transition between consecutive DFT blocks and/or to reduce blocking artifacts.

According to further embodiments, the multichannel decoder 146 is configured to obtain the first and the second channel signal from the mono signal, wherein the mono signal is a mid signal of a multichannel signal and wherein the multichannel decoder 146 is configured to obtain a M/S multichannel decoded audio signal, wherein the multichannel decoder is configured to calculate the side signal from the multichannel information. Furthermore, the multichannel decoder 146 may be configured to calculate a L/R multichannel decoded audio signal from the M/S multichannel decoded audio signal, wherein the multichannel decoder 146 may calculate the UR multichannel decoded audio signal for a low band using the multichannel information and the side signal. Additionally or alternatively, the multichannel decoder 146 may calculate a predicted side signal from the mid signal and wherein the multichannel decoder may be further configured to calculate the L/R multichannel decoded audio signal for a high band using the predicted side signal and an ILD value of the multichannel information.

Moreover, the multichannel decoder 146 may be further configured to perform a complex operation on the L/R decoded multichannel audio signal, wherein the multichannel decoder may calculate a magnitude of the complex operation using an energy of the encoded mid signal and an energy of the decoded L/R multichannel audio signal to obtain an energy compensation. Furthermore, the multichannel decoder is configured to calculate a phase of the complex operation using an IPD value of the multichannel information. After decoding, an energy, level, or phase of the decoded multichannel signal may be different from the decoded mono signal. Therefore, the complex operation may be determined such that the energy, level, or phase of the multichannel signal is adjusted to the values of the decoded mono signal. Moreover, the phase may be adjusted to a value of a phase of the multichannel signal before encoding, using e.g. calculated IPD parameters from the multichannel information calculated at the encoder side. Furthermore, a human perception of the decoded multichannel signal may be adapted to a human perception of the original multichannel signal before encoding.

Figure 20:
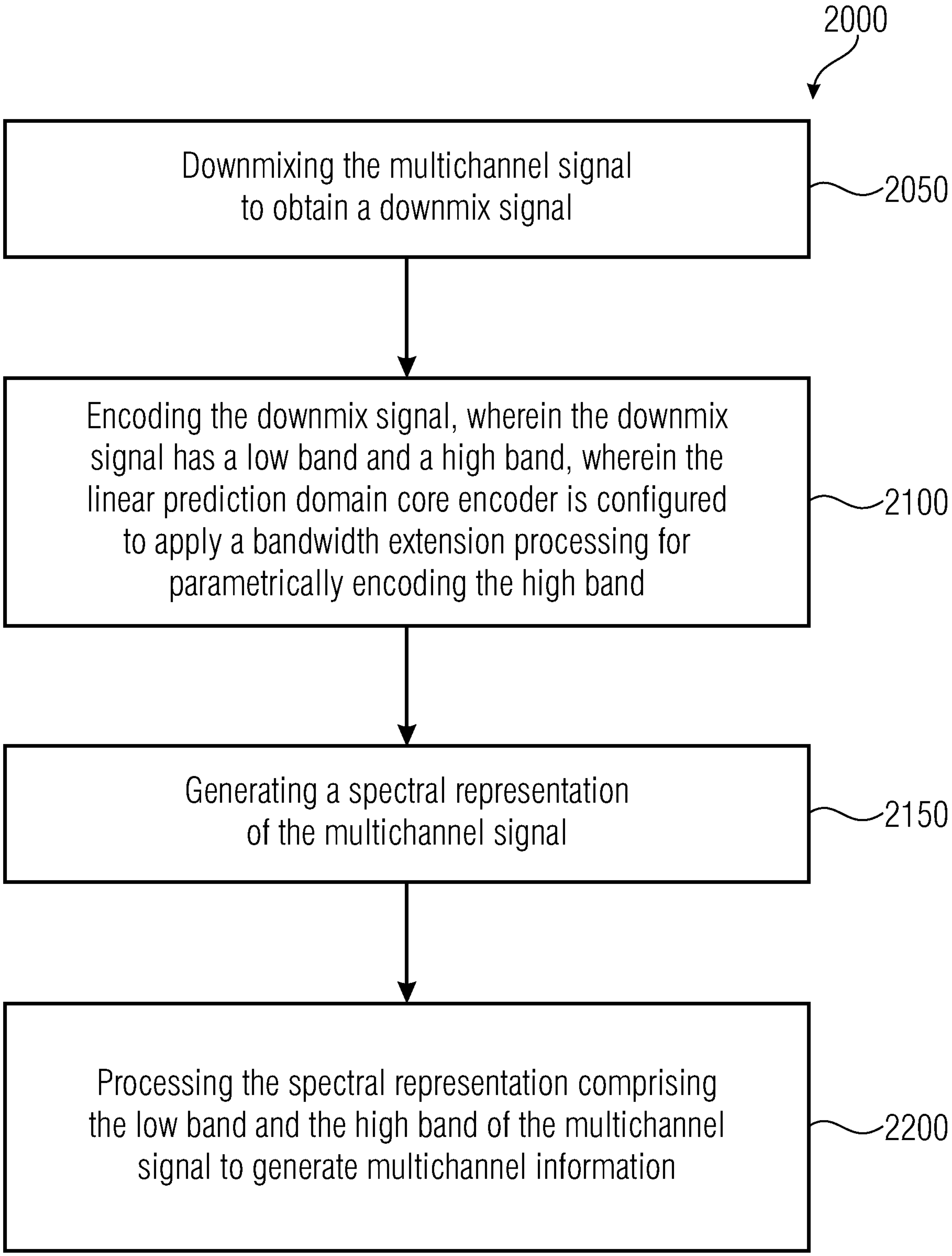
FIG. 20 shows a schematic block diagram of a method of audio encoding for encoding a multichannel signal according to a further aspect.

FIG. 20 shows a schematic illustration of a flow diagram of a method 2000 for encoding a multichannel signal. The method comprises a step 2050 of downmixing the multichannel signal to obtain a downmix signal, a step 2100 of encoding the downmix signal, wherein the downmix signal has a low band and a high band, wherein the linear prediction domain core encoder is configured to apply a bandwidth extension processing for parametrically encoding the high band, a step 2150 of generating a spectral representation of the multichannel signal, and a step 2200 of processing the spectral representation comprising the low band and the high band of the multichannel signal to generate multichannel information.

Figure 21:
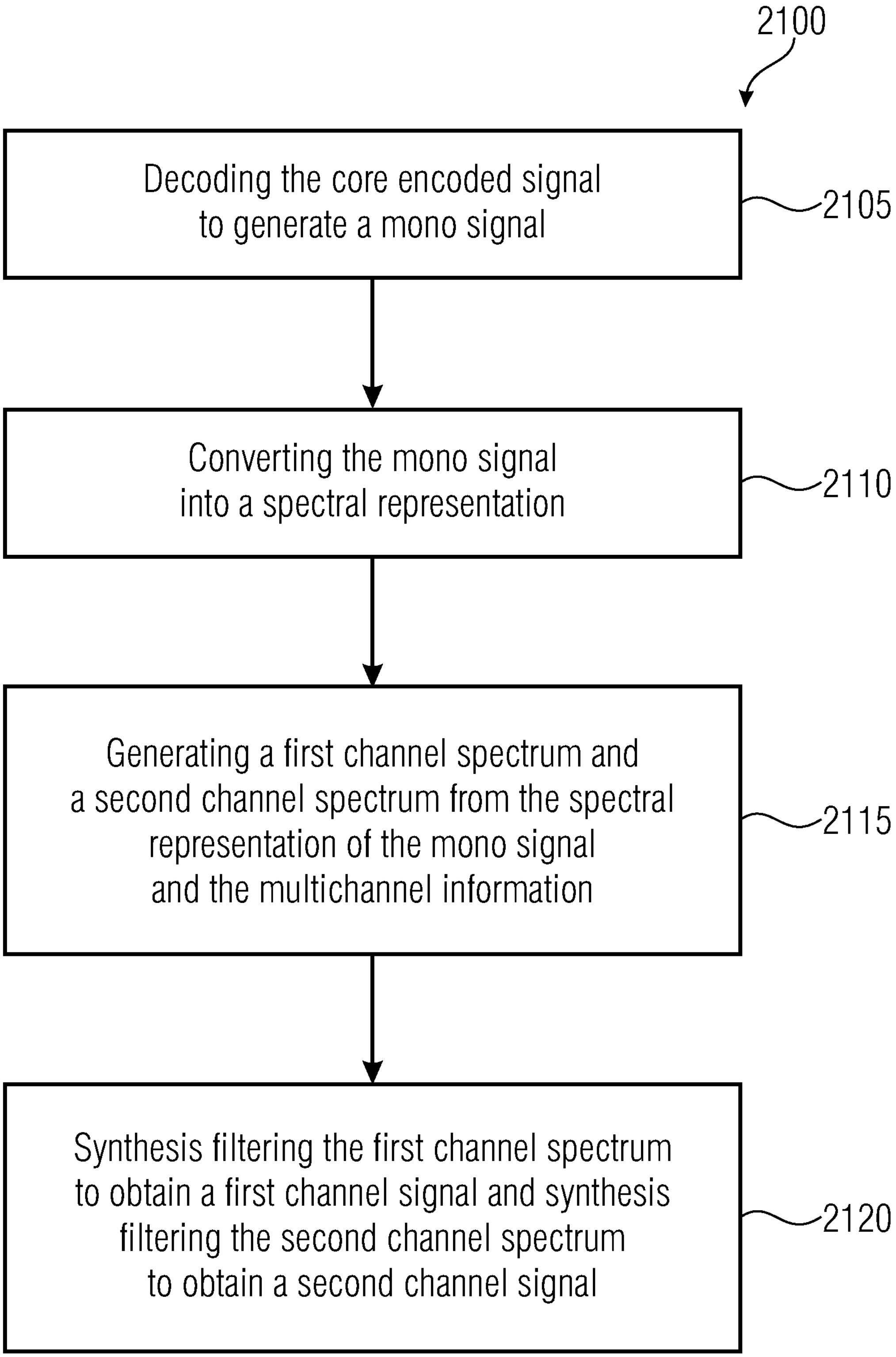
FIG. 21 shows a schematic block diagram of a method of decoding an encoded audio signal according to a further aspect.

FIG. 21 shows a schematic illustration of a flow diagram of a method 2100 of decoding an encoded audio signal, comprising a core encoded signal, bandwidth extension parameters, and multichannel information. The method comprises a step 2105 of decoding the core encoded signal to generate a mono signal, a step 2110 of converting the mono signal into a spectral representation, a step 2115 of generating a first channel spectrum and a second channel spectrum from the spectral representation of the mono signal and the multichannel information and a step 2120 of synthesis filtering the first channel spectrum to obtain a first channel signal and synthesis filtering the second channel spectrum to obtain a second channel signal.

Further embodiments are described as follows.

Bitstream Syntax Changes

The table 23 of the USAC specifications [1] in section 5.3.2 Subsidiary payload should be modified as follows:

TABLE 1

Syntax of UsacCoreCoderData( )

| Syntax | No. of bits | Mnemonic |
|---|---|---|
| UsacCoreCoderData(nrChannels, indepFlag) | | |
| { | | |
| for (ch=0; ch < nrChannels; ch++) { | | |
| core_mode[ch]; | 1 | uimsbf |
| } | | |
| if (nrChannels == 2) { | | |
| StereoCoreToolInfo(core_mode); | | |
| } | | |
| for (ch=0; ch<nrChannels; ch++) { | | |
| if (core_mode[ch] == 1) { | | |
| if (ch==1 && core_mode[1] == core_mode[0]){ | | |
| Ipd_stereo_stream( ); | | |
| }else{ | | |
| Ipd_channel_stream(indepFlag); | | |
| } | | |
| } | | |
| else { | | |
| if ( (nrChannels == 1) \|\| (core_mode[0] != core_mode[1]) ) { | | |
| tns_data_present[ch]; | 1 | uimsbf |
| } | | |

TABLE 1-continued

| Syntax of UsacCoreCoderData( ) | | |
|---|---|---|
| Syntax | No. of bits | Mnemonic |
| fd_channel_stream(common_window, common_tw, | | |
| tns_data_present[ch], noiseFilling, indepFlag); | | |
| } | | |
| } | | |
| } | | |

The following table should be added:

TABLE 1

| Syntax of Ipd_stereo_stream( ) | | |
|---|---|---|
| Syntax | No. of bits | Mnemonic |
| Ipd_stereo_stream(indepFlag) | | |
| { | | |
| for(l=0,n=0;l<ccfl;l+=M,n++){ | | |
| res_mode | 1 | uimsbf |
| q_mode | 1 | uimsbf, |
| ipd_mode | 2 | uimsbf |
| pred_mode | 1 | uimsbf |
| cod_mode | 2 | uimsbf |
| nbands=band_config(N, res_mode) | | |
| ipd_band_max=max_band[res_mode][ipd_mode] | | |
| cod_band_max=max_band[res_mode][cod_mode] | | |
| cod_L=2*(band_limits[cod_band_max]-1) | | |
| for (k=1;k>=0;k--) { | | |
| if(q_mode==0 \|\| k== 1){ | | |
| for(b=0;b< nbands;b++){ | | |
| ild_idx[2n+k][b] | 5 | |
| } | | |
| for(b=0;b< ipd_band_max;b++){ | | |
| ipd_idx[2n+k][b] | 3 | |
| } | | |
| if(pred_mode==1){ | | |
| for(b=cod_band_max;b< | | |
| nbands;b++){ | 3 | |
| pred_gain_idx[2n+k][b] | | |
| } | | |
| } | | |
| } | 7 | |
| if(cod_mode==1){ | | |
| cod_gain_idx[2n+k] | | |
| for(i=0;i< cod_L/8;i++){ | | |
| code_book_indices(i, 1, 1) | | |
| } | | |
| } | | |
| } | | |
| } | | |

The following payload description should be added in section 6.2, USAC payload.

6.2.x Ipd_stereo_stream( )

Detailed decoding procedure is described in the 7.x LPD stereo decoding section.

Terms and Definitions

Ipd_stereo_stream( ) Data element to decode the stereo data for the LPD mode res_mode Flag which indicates the frequency resolution of the parameter bands.

q_mode Flag which indicates the time resolution of the parameter bands.

ipd_mode Bit field which defines the maximum of parameter bands for the IPD parameter.

pred_mode Flag which indicates if prediction is used.

cod_mode Bit field which defines the maximum of parameter bands for which the side signal is quantized.

Ild_idx[k][b] ILD parameter index for the frame k and band b.

Ipd_idx[k][b] IPD parameter index for the frame k and band b.

pred_gain_idx[k][b] Prediction gain index for the frame k and band b.

cod_gain_idx Global gain index for the quantized side signal.

Helper Elements ccfl Core code frame length.

M Stereo LPD frame length as defined in Table 7.x.1.

band_config( ) Function that returns the number of coded parameter bands. The function is defined in 7.x band_limits( ) Function that returns the number of coded parameter bands. The function is defined in 7.x max_band( ) Function that returns the number of coded parameter bands. The function is defined in 7.x ipd_max_band( ) Function that returns the number of coded parameter bands. The function cod_max_band( ) Function that returns the number of coded parameter bands. The function cod_L Number of DFT lines for the decoded side signal.

Decoding Process

LPD Stereo Coding

Tool Description

LPD stereo is a discrete M/S stereo coding, where the Mid-channel is coded by the mono LPD core coder and the Side signal coded in the DFT domain. The decoded Mid signal is output from the LPD mono decoder and then processed by the LPD stereo module. The stereo decoding is done in the DFT domain where the L and R channels are decoded. The two decoded channels are transformed back in the Time Domain and can be then combined in this domain with the decoded channels from the FD mode. The FD coding mode is using its own stereo tools, i.e. discrete stereo with or without complex prediction.

Data Elements res_mode Flag which indicates the frequency resolution of the parameter bands.

q_mode Flag which indicates the time resolution of the parameter bands.

ipd_mode Bit field which defines the maximum of parameter bands for the IPD parameter.

pred_mode Flag which indicates if prediction is used.

cod_mode Bit field which defines the maximum of parameter bands for which the side signal is quantized.

Ild_idx[k][b] ILD parameter index for the frame k and band b.

Ipd_idx[k][b] IPD parameter index for the frame k and band b.

pred_gain_idx[k][b] Prediction gain index for the frame k and band b.

cod_gain_idx Global gain index for the quantized side signal.

Help Elements ccfl Core code frame length.

M Stereo LPD frame length as defined in Table 7.x.1.

band_config( ) Function that returns the number of coded parameter bands. The function is defined in 7.x band_limits( ) Function that returns the number of coded parameter bands. The function is defined in 7.x max_band( ) Function that returns the number of coded parameter bands. The function is defined in 7.x ipd_max_band( ) Function that returns the number of coded parameter bands. The function cod_max_band( ) Function that returns the number of coded parameter bands. The function cod_L Number of DFT lines for the decoded side signal.

Decoding Process

The stereo decoding is performed in the frequency domain. It acts as a post-processing of the LPD decoder. It receives from the LPD decoder the synthesis of the mono Mid-signal.

The Side signal is then decoded or predicted in the frequency domain. The channel spectrums are then reconstructed in the frequency domain before being resynthesized in the time domain. The stereo LPD works with a fixed frame size equal to the size of the ACELP frame independently of the coding mode used in LPD mode.

Frequency Analysis

The DFT spectrum of the frame index i is computed from the decoded frame x of length M.

$$X_i[k] = \sum_{n=0}^{N-1} w[n]\cdot x[i\cdot M + n - L]\cdot e^{-2\pi jkn/N}$$

where N is the size of the signal analysis, w is the analysis window and x the decoded time signal from the LPD decoder at frame index i delayed by the overlap size L of the DFT. M is equal to the size of the ACELP frame at the sampling rate used in the FD mode. N is equal to the stereo LPD frame size plus the overlap size of the DFT. The sizes are depending of the used LPD version as reported in Table 7.x.1.

TABLE 7.x.1

DFT and frame sizes of the stereo LPD

| LPD version | DFT size N | Frame size M | Overlap size L |
|---|---|---|---|
| 0 | 336 | 256 | 80 |
| 1 | 672 | 512 | 160 |

The window w is a sine window defined as:

$$w[n] = \begin{cases} \sin\left(\frac{\pi}{2L}\left(n+\frac{1}{2}\right)\right) & \text{for } 0 \le n < L \\ 1 & \text{for } L \le n < M \\ \sin\left(\frac{\pi}{2L}\left(L+n+\frac{1}{2}\right)\right) & \text{for } M \le n < M+L \end{cases}$$

Configuration of the Parameter Bands

The DFT spectrum is divided into non-overlapping frequency bands called parameter bands. The partitioning of the spectrum is non-uniform and mimics the auditory frequency decomposition. Two different divisions of the spectrum are possible with bandwidths following roughly either two or four times the Equivalent Rectangular Bandwidth (ERB). The spectrum partitioning is selected by the data element res_mod and defined by the following pseudo-code:

```
funtion nbands=band_config(N,res_mod)
band_limits[0]=1;
nbands=0;
while(band_limits[nbands++]<(N/2)){
  if(stereo_Ipd_res==0)
    band_limits[nbands]=band_limits_erb2[nbands];
  else
    band_limits[nbands]=band_limits_erb4[nbands];
}
nbands−−;
band_limits[nbands]=N/2;
return nbands
```

where nbands is the total number of parameter bands and N the DFT analysis window size. The tables band_limits_erb2 and band_limits_erb4 are defined in Table 7.x.2. The decoder can adaptively change the resolutions of parameter bands of the spectrum at every two stereo LPD frames.

TABLE 7.x.2

Parameter band limits in term of DFT index k

| Parameter band index b | band_limits_erb2 | band_limits_erb4 |
|---|---|---|
| 0 | 1 | 1 |
| 1 | 3 | 3 |
| 2 | 5 | 7 |
| 3 | 7 | 13 |
| 4 | 9 | 21 |
| 5 | 13 | 33 |
| 6 | 17 | 49 |
| 7 | 21 | 73 |
| 8 | 25 | 105 |
| 9 | 33 | 177 |
| 10 | 41 | 241 |
| 11 | 49 | 337 |
| 12 | 57 | |
| 13 | 73 | |
| 14 | 89 | |
| 15 | 105 | |
| 16 | 137 | |
| 17 | 177 | |
| 18 | 241 | |
| 19 | 337 | |

The maximal number of parameter bands for IPD is sent within the 2 bits field ipd_mod data element:

ipd_max_band=max_band[res_mod][ipd_mod]

The maximal number of parameter bands for the coding of the Side signal is sent within the 2 bits field cod_mod data element:

cod_max_band=max_band[res_mod][cod_mod]

The table max_band≡ □≡ □ is defined in Table 7.x.3.

The number of decoded lined to expect for the side signal is then computed as:

cod_L=2·(band_limits[cod_max_band]−1)

TABLE 7.x.3

Maximum number of bands for different code modes

| Mode index | max_band[0] | max_band[1] |
|---|---|---|
| 0 | 0 | 0 |
| 1 | 7 | 4 |
| 2 | 9 | 5 |
| 3 | 11 | 6 |

Inverse Quantization of Stereo Parameters

The stereo parameters Interchannel Level Differencies (ILD), Interchannel Phase Differencies (IPD) and prediction gains are sent either every frame or every two frames depending of flag q_mode. If q_mode equal 0, the parameters are updated every frame. Otherwise, the parameters values are only updated for odd index i of the stereo LPD frame within the USAC frame. The index i of the stereo LPD frame within USAC frame can be either between 0 and 3 in LPD version 0 and between 0 and 1 in LPD version 1. The ILD are decoded as follows:

$ILD_i$[b]=ild_q[ild_idx[i][b]], for 0≤b<nbands

The IPD are decoded for the ipd_max_band first bands:

$$IPD_i[b] - \frac{\pi}{4}\cdot \text{ipd\_idx}[i][b] - \pi,$$
$$\text{for } 0 \le b < \text{ipd\_max\_band}$$

The prediction gains are only decoded of pred_mode flag is set to one. The decoded gains are then:

$$\text{pred\_gain}_i[b] = \begin{cases} 0, & \text{for } 0 \le b < \text{cod\_max\_band} \\ res\ pred\ gain\ q[\,pred\ \ gain\ \ idx\,][i][b], & \text{for } cod \text{ max band} \le b < nbands \end{cases}$$

If the pred_mode equal to zero, all gains are et to zero.

Undependently of the value of q_mode, the decoding of the side signal is performed every frame if code_mode is a non-zero value. It first decode a global gain:

$\text{cod\_gain}_i = 10^{cod\_gain\_idx(i)\cdot 20\text{-}127/90}$

The decoded shape of the Side signal is the output of the AVQ described in USAC specification [1] in section.

$$S_i[1+8k+n] = kv[k][0][n], \text{ for } 0 \le n < 8 \text{ and } 0 \le k < \frac{\text{cod\_L}}{8}$$

TABLE 7.x.4

| Inverse quantization table ild_q[ ] | | | |
|---|---|---|---|
| Index | output | index | Output |
| 0 | −50 | 16 | 2 |
| 1 | −45 | 17 | 4 |
| 2 | −40 | 18 | 6 |
| 3 | −35 | 19 | 8 |
| 4 | −30 | 20 | 10 |
| 5 | −25 | 21 | 13 |
| 6 | −22 | 22 | 16 |
| 7 | −19 | 23 | 19 |
| 8 | −16 | 24 | 22 |
| 9 | −13 | 25 | 25 |
| 10 | −10 | 26 | 30 |
| 11 | −8 | 27 | 35 |
| 12 | −6 | 28 | 40 |
| 13 | −4 | 29 | 45 |
| 14 | −2 | 30 | 50 |
| 15 | 0 | 31 | reserved |

TABLE 7.x.5

| Inverse quantization table res_pres_gain_q[ ] | |
|---|---|
| index | output |
| 0 | 0 |
| 1 | 0.1170 |

TABLE 7.x.5-continued

| Inverse quantization table res_pres_gain_q[ ] | |
|---|---|
| index | output |
| 2 | 0.2270 |
| 3 | 0.3407 |
| 4 | 0.4645 |
| 5 | 0.6051 |
| 6 | 0.7763 |
| 7 | 1 |

Inverse Channel Mapping

The Mid signal X and Side signal S are first converted to the left and right channels L and R as follows:

$L_i[k]=X_i[k]+gX_i[k]$, for band_limits[b]≤k<band_limits[b+1], $R_i[k]=X_i[k]-gX_i[k]$, for band_limits[b]≤k<band_limits[b+1], where the gain g per parameter band is derived from the ILD parameter:

$$g = \frac{c-1}{c+1},$$

where $c=10^{ILD_i[b]/20}$

For parameter bands below cod_max_band, the two channels are updated with the decoded Side signal:

$L_i[k]=L_i[k]+\text{cod\_gain}_i\cdot S_i[k]$, for 0≤k<band_limits[cod_max_band], $R_i[k]=R_i[k]-\text{cod\_gain}_i\cdot S_i[k]$, for 0≤k<band_limits[cod_max_band], For higher parameter bands, the side signal is predicted and the channels updates as:

$L_i[k]=L_i[k]+\text{cod pred}_i[b]\cdot X_{i-1}[k]$, for band_limits[b]≤k<band_limits[b+1], $R_i[k]=R_i[k]-\text{cod\_pred}_i[b]\cdot X_{i-1}[k]$, for band_limits[b]≤k<band_limits[b+1], Finally the channels are multiplied by a complex value aiming to restore the original energy and the inter-channel phase of signals:

$L_i[k]-\alpha\cdot e^{j2\pi R}\cdot L_i[k]$ $R_i[k]-\alpha\cdot e^{j2\pi\beta}\cdot R_i[k]$ where $$a = \sqrt{2\cdot\frac{\sum_{k=band\_limits[b]}^{band\_limits[b+1]} X_i^2[k]}{\sum_{k=band\_limits[b]}^{band\_limits[b+1]-1} L_i^2[k] + \sum_{k=band\_limits[b]}^{band\_limits[b+1]-1} R_i^2[k]}}$$

where c is bound to be −12 and 12 dB.

and where $\beta=\text{atan2}(\sin(IPD_i[b]), \cos(IPD_i[b])+c)$,

Where atan2(x,y) is the four-quadrant inverse tangent of x over y.

Time Domain Synthesis

From the two decoded spectrums L and R, two time domain signals l and r are synthesized by an inverse DFT:

$$l_i[n] = \sum_{k=0}^{N-1} L_i[k]\cdot e^{\frac{2\pi jkn}{N}}, \text{ for } 0 \le n < N$$

-continued $$r_i[n] = \sum_{k=0}^{N-1} R_i[k] \cdot e^{\frac{2\pi jkn}{N}}, \text{ for } 0 \le n < N$$

Finally an overlap and add operation allow reconstructing a frame of M samples:

$$l[i \cdot M + n - L] = \begin{cases} l_{i-1}[M+n] \cdot w[L-1-n] + l_i[n] \cdot w[n], & \text{for } 0 \le n < L \\ l_i[n], & \text{for } L \le n < M \end{cases}$$

$$r[i \cdot M + n - L] = \begin{cases} r_{i-1}[M+n] \cdot w[L-1-n] + r_i[n] \cdot w[n], & \text{for } 0 \le n < L \\ r_i[n], & \text{for } L \le n < M \end{cases}$$

Post-Processing

The bass post-processing is applied on two channels separately. The processing is for both channels the same as described in section 7.17 of [1].

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC DIS 23003-3, Usac
[2] ISO/IEC DIS 23008-3, 3D Audio

The invention claimed is:

1. An audio encoder for encoding a multichannel signal, comprising:

a downmixer for downmixing the multichannel signal to acquire a downmix signal, wherein the downmixer is configured as an active downmixer or a passive downmixer;

a linear prediction domain core encoder for encoding the downmix signal, wherein the downmix signal comprises a low band and a high band, wherein the linear prediction domain core encoder is configured to apply a bandwidth extension processing for parametrically encoding the high band;

a filterbank for generating a spectral representation of the multichannel signal; and a joint multichannel encoder configured to process the spectral representation comprising the low band and the high band of the multichannel signal to generate multichannel information.

2. The audio encoder according to claim 1, wherein the linear prediction domain core encoder further comprises a linear prediction domain decoder for decoding the encoded downmix signal to acquire an encoded and decoded downmix signal; and wherein the audio encoder further comprises a multichannel residual coder for calculating an encoded multichannel residual signal using the encoded and decoded downmix signal, the multichannel residual signal representing an error between a decoded multichannel representation using the multichannel information and the multichannel signal before downmixing.

3. The audio encoder of claim 1, wherein the linear prediction domain core encoder is configured to apply a bandwidth extension processing for parametrically encoding the high band, wherein the linear prediction domain decoder is configured to acquire, as the encoded and decoded downmix signal, only a low band signal representing the low band of the downmix signal, and wherein an encoded multichannel residual signal comprises only a band corresponding to the low band of the multichannel signal before downmixing.

4. The audio encoder according to claim 1, wherein the active downmixer comprises a time-frequency converter, a downmixing stage and a frequency-time converter, or wherein the passive downmixer comprises an adder for adding a first channel of the multichannel signal and a second channel of the multichannel signal subsequent to using weights.

5. The audio encoder according to claim 1, wherein the linear prediction domain core encoder comprises a TCX processor wherein the TCX processor is configured to operate on the downmix signal not downsampled or downsampled by a degree smaller than the downsampling for the ACELP processor, the TCX processor comprising a first time-frequency converter, a first parameter generator for generating a parametric representation of a first set of bands and a first quantizer encoder for generating a set of quantized encoded spectral lines for a second set of bands.

6. The audio encoder according to claim 5, wherein the time-frequency converter is different from the filterbank, wherein the filterbank comprises filter parameters optimized to generate a spectral representation of the multichannel signal, or wherein the time-frequency converter comprises filter parameters optimized to generate a parametric representation of a first set of bands.

7. The audio encoder according to claim 1, wherein the joint multichannel encoder comprises a first frame generator and wherein the linear prediction domain core encoder comprises a second frame generator, wherein the first and the second frame generators are configured to form a frame from the multichannel signal, wherein the first and the second frame generators are configured to form a frame of a similar length.

8. The audio encoder according to claim 1, further comprising:

a linear prediction domain encoder comprising the linear prediction domain core encoder and the multichannel encoder;

a frequency domain encoder; and a controller for switching between the linear prediction domain encoder and the frequency domain encoder, wherein the frequency domain encoder comprises a second joint multichannel encoder for encoding second multichannel information from the multichannel signal, wherein the second joint multichannel encoder is different from the first joint multichannel encoder, and wherein the controller is configured such that a portion of the multichannel signal is represented either by an encoded frame of the linear prediction domain encoder or by an encoded frame of the frequency domain encoder.

9. The audio encoder according to claim 1, wherein the linear prediction domain core encoder is configured to calculate the downmix signal as a parametric representation of a mid signal of an M/S multichannel audio signal;

wherein the multichannel residual coder is configured to calculate a side signal corresponding to the mid signal of the M/S multichannel audio signal, wherein the multichannel residual coder is configured to calculate a high band of the mid signal using simulating time domain bandwidth extension or wherein the multichannel residual coder is configured to predict the high band of the mid signal using finding a prediction information that minimizes a difference between a calculated side signal and a calculated full band mid signal from a previous frame.

10. An audio decoder for decoding an encoded audio signal comprising a core encoded signal, bandwidth extension parameters, and multichannel information, the audio decoder comprising:

a linear prediction domain core decoder for decoding the core encoded signal to generate a mono signal;

an analysis filterbank to convert the mono signal into a spectral representation being partitioned into non-uniform parameter bands;

a multichannel decoder for generating a first channel spectrum and a second channel spectrum from the spectral representation of the mono signal and the multichannel information; and a synthesis filterbank processor for synthesis filtering the first channel spectrum to acquire a first channel signal and for synthesis filtering the second channel spectrum to acquire a second channel signal.

11. The audio decoder according to claim 10, comprising:

wherein the linear prediction domain core decoder comprises a bandwidth extension processor for generating a high band portion from the bandwidth extension parameters and the lowband mono signal or the core encoded signal to acquire a decoded high band of the audio signal;

wherein the linear prediction domain core decoder further comprises a low band signal processor configured to decode the low band mono signal;

wherein the linear prediction domain core decoder further comprises a configured to calculate a full band mono signal using the decoded low band mono signal and the decoded high band of the audio signal.

12. The audio decoder of claim 10, wherein the linear prediction domain decoder comprises:

the ACELP decoder, a low band synthesizer, an upsampler, the time domain bandwidth extension processor or a second combiner, wherein the second combiner is configured for combining an upsampled low band signal and a bandwidth-extended high band signal to acquire a full band ACELP decoded mono signal;

a TCX decoder and an intelligent gap filling processor to acquire a full band TCX decoded mono signal;

a full band synthesis processor for combining the full band ACELP decoded mono signal and the full band TCX decoded mono signal, or wherein a cross-path is provided for initializing the low band synthesizer using information derived by a low band spectrum-time conversion from the TCX decoder and the IGF processor.

13. The audio decoder of claim 10, further comprising:

a frequency domain decoder;

a second joint multichannel decoder for generating a second multichannel representation using an output of the frequency domain decoder and a second multichannel information; and a first combiner for combining the first channel signal and the second channel signal with the second multichannel representation to acquire a decoded audio signal;

wherein the second joint multichannel decoder is different from the multichannel decoder.

14. The audio decoder of claim 10, wherein the analysis filterbank comprises a DFT (Discrete Fourier Transform) to convert the mono signal into a spectral representation and wherein the synthesis filterbank processor comprises an IDFT (Inverse Discrete Fourier Transform) to convert the first channel spectrum into the first channel signal and to convert the second channel spectrum into the second channel signal.

15. The audio decoder of claim 14, wherein the analysis filterbank is configured to apply a window on the DFT-converted spectral representation such that a right portion of the spectral representation of a previous frame and a left portion of the spectral representation of a current frame are overlapping, wherein the previous frame and the current frame are consecutive.

16. The audio decoder of claim 10, wherein the multichannel decoder is configured to acquire the first and the second channel signals from the mono signal, wherein the mono signal is a mid signal of a multichannel signal and wherein the multichannel decoder is configured to acquire a M/S multichannel decoded audio signal, wherein the multichannel decoder is configured to calculate the side signal from the multichannel information.

17. The audio decoder of claim 16, wherein the multichannel decoder is configured to calculate a L/R multichannel decoded audio signal from the M/S multichannel decoded audio signal, to calculate the L/R multichannel decoded audio signal for a low band using the multichannel information and the side signal; or to calculate a predicted side signal from the mid signal and wherein the multichannel decoder is further configured to calculate the L/R multichannel decoded audio signal for a high band using the predicted side signal and an ILD value of the multichannel information.

18. The audio decoder of claim 16, wherein the multichannel decoder is further configured to perform a complex operation on the L/R decoded multichannel audio signal;

wherein the multichannel decoder is configured to calculate a magnitude of the complex operation using an energy of the encoded mid signal and an energy of the decoded L/R multichannel audio signal to acquire an energy compensation; and wherein the multichannel decoder is configured to calculate a phase of the complex operation using an IPD (inter channel phase difference) value of the multichannel information.

19. A method for encoding a multichannel signal, the method comprising:

downmixing the multichannel signal to acquire a downmix signal, wherein the downmixing comprises active downmixing or passive downmixing;

encoding the downmix signal, wherein the downmix signal comprises a low band and a high band, wherein the encoding the downmix signal comprises applying a bandwidth extension processing for parametrically encoding the high band;

generating a spectral representation of the multichannel signal; and processing the spectral representation comprising the low band and the high band of the multichannel signal to generate multichannel information.

20. A method of decoding an encoded audio signal, comprising a core encoded signal, bandwidth extension parameters, and multichannel information, the method comprising decoding the core encoded signal to generate a mono signal;

converting the mono signal into a spectral representation being partitioned into non-uniform parameter bands;

generating a first channel spectrum and a second channel spectrum from the spectral representation of the mono signal and the multichannel information; and synthesis filtering the first channel spectrum to acquire a first channel signal and synthesis filtering the second channel spectrum to acquire a second channel signal.

21. A non-transitory digital storage medium having a computer program stored thereon to perform the method for encoding a multichannel signal, the method comprising:

downmixing the multichannel signal to acquire a downmix signal, encoding the downmix signal, wherein the downmix signal comprises a low band and a high band, wherein the encoding the downmix signal comprises applying a bandwidth extension processing for parametrically encoding the high band;

generating a spectral representation of the multichannel signal; and processing the spectral representation comprising the low band and the high band of the multichannel signal to generate multichannel information, when said computer program is run by a computer.

22. A non-transitory digital storage medium having a computer program stored thereon to perform the method of decoding an encoded audio signal, comprising a core encoded signal, bandwidth extension parameters, and multichannel information, the method comprising:

decoding the core encoded signal to generate a mono signal;

converting the mono signal into a spectral representation;

generating a first channel spectrum and a second channel spectrum from the spectral representation of the mono signal and the multichannel information; and synthesis filtering the first channel spectrum to acquire a first channel signal and synthesis filtering the second channel spectrum to acquire a second channel signal, when said computer program is run by a computer.

* * * * *